United States Patent
Lin et al.

(10) Patent No.: US 12,063,671 B2
(45) Date of Patent: Aug. 13, 2024

(54) DOWNLINK CONTROL INFORMATION (DCI) SIZE MATCHING

(71) Applicant: Telefonaktiebolaget LM Ericsson (publ), Stockholm (SE)

(72) Inventors: Xingqin Lin, Santa Clara, CA (US); Stefan Parkvall, Bromma (SE); Jung-Fu Cheng, Fremont, CA (US); Jianwei Zhang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 479 days.

(21) Appl. No.: 17/287,047

(22) PCT Filed: Oct. 28, 2019

(86) PCT No.: PCT/SE2019/051061
§ 371 (c)(1),
(2) Date: Apr. 20, 2021

(87) PCT Pub. No.: WO2020/085991
PCT Pub. Date: Apr. 30, 2020

(65) Prior Publication Data
US 2021/0368509 A1    Nov. 25, 2021

Related U.S. Application Data

(60) Provisional application No. 62/751,018, filed on Oct. 26, 2018.

(51) Int. Cl.
*H04W 72/53* (2023.01)
*H04W 24/08* (2009.01)
(Continued)

(52) U.S. Cl.
CPC ......... *H04W 72/53* (2023.01); *H04W 24/08* (2013.01); *H04W 72/0453* (2013.01); *H04W 72/23* (2023.01)

(58) Field of Classification Search
None
See application file for complete search history.

(56) References Cited

U.S. PATENT DOCUMENTS 10,813,137 B2 * 10/2020 Shih ............... H04W 72/23
2019/0082431 A1 * 3/2019 Yi .................. H04W 72/0446
(Continued)

FOREIGN PATENT DOCUMENTS

| CN | 108521321 A | 9/2018 |
| CN | 108633070 A | 10/2018 |

(Continued)

OTHER PUBLICATIONS

LG Electronics, "Remaining issues on bandwidth part operation", 3GPP TSG RAN WG1 Meeting AH 1801, R1-1800384, Vancouver, Canada, Jan. 22-26, 2018, 1-14.

(Continued)

*Primary Examiner* — Gregory B Sefcheck
(74) *Attorney, Agent, or Firm* — Murphy, Bilak & Homiller, PLLC

(57) ABSTRACT

Systematic size matching procedures for downlink control information, DCI, provide exact instructions on how DCI size matching is to be performed in a NR wireless system, to meet predetermined limits for how many different DCI sizes may be monitored by a user equipment, UE. With these procedures, consistent and exact DCI size matching can be performed while keeping blind decoding procedures manageable, ensuring common understanding of DCI contents between the UE and the network.

20 Claims, 3 Drawing Sheets

---

310: APPLY RULE 1 FOR DETERMINING DCI SIZES

320: APPLY ANY OF RULES 2-9 FOR DETERMINING DCI SIZES

330: MONITOR ONE OR MORE CONFIGURED SEARCH SPACES FOR DCI MESSAGE TRANSMITTED TO UE, USING DETERMINED DCI SIZES

(51) Int. Cl.
*H04W 72/0453* (2023.01)
*H04W 72/23* (2023.01)

(56) References Cited

U.S. PATENT DOCUMENTS

| | | | | |
|---|---|---|---|---|
| 2019/0132824 A1* | 5/2019 | Jeon | .......................... | H04L 5/00 |
| 2019/0222404 A1* | 7/2019 | Ang | ...................... | H04L 5/0096 |
| 2019/0297604 A1* | 9/2019 | Lee | ........................ | H04L 1/0072 |
| 2019/0313377 A1* | 10/2019 | Abdoli | .................. | H04L 1/0046 |
| 2019/0313378 A1* | 10/2019 | Abdoli | ................ | H04W 52/325 |
| 2019/0342907 A1* | 11/2019 | Huang | ................... | H04W 72/23 |
| 2019/0349147 A1* | 11/2019 | Aiba | .................. | H04L 5/0094 |
| 2019/0349180 A1* | 11/2019 | Lu | ........................ | H04L 27/2607 |
| 2019/0364602 A1* | 11/2019 | Yi | .......................... | H04W 72/20 |
| 2020/0037245 A1* | 1/2020 | Lu | .......................... | H04W 72/23 |
| 2020/0120584 A1* | 4/2020 | Yi | ............................ | H04L 5/005 |
| 2021/0160035 A1* | 5/2021 | Kittichokechai | ..... | H04L 5/0053 |
| 2021/0320821 A1* | 10/2021 | Lee | ........................ | H04W 56/00 |
| 2021/0385750 A1* | 12/2021 | Maleki | .................. | H04W 76/28 |
| 2021/0392531 A1* | 12/2021 | Lu | ........................ | H04W 52/146 |
| 2021/0400699 A1* | 12/2021 | Nory | ................. | H04W 72/0446 |
| 2022/0061080 A1* | 2/2022 | Takeda | ................ | H04L 27/2601 |

FOREIGN PATENT DOCUMENTS

| | | | |
|---|---|---|---|
| WO | 2018030864 A1 | 2/2018 |
| WO | 2018143740 A1 | 8/2018 |
| WO | 2018174614 A1 | 9/2018 |

OTHER PUBLICATIONS

3GPP, "3rd Generation Partnership Project; Technical Specification Group Radio Access Network; NR; Multiplexing and channel coding (Release 15)", 3GPP TS 38.212 V15.1.1, Apr. 2018, pp. 1-100.

3GPP, "3rd Generation Partnership Project; Technical Specification Group Radio Access Network; NR; Multiplexing and channel coding (Release 15)", 3GPP TS 38.212 V15.3.0, Sep. 2018, pp. 1-99.

Ericsson, "Outcome of offline discussion on 7.1.3.1.4 (DCI content)—part II", TSG-RAN WG1 #93, R1-1807738, Busan, Korea, May 21-May 25, 2018, pp. 1-15.

Ericsson, "Outcome of offline session on 7.1.3.1.4 (DCI contents and formats)", TSG-RAN WG1 #92, R1-1803369, Athens, Greece, Feb. 26-Mar. 2, 2018, pp. 1-3.

Lin, Xingqin, et al., "5G New Radio: Unveiling the Essentials of the Next Generation Wireless Access Technology", [Online] https://arxiv.org/ftp/arxiv/papers/1806/1806.06898.pdf, accessed Oct. 2018, 1-8.

Nokia, et al., "On the remaining issues for DCI format sizes and contents", 3GPP TSG RAN WG1 Meeting #93, R1-1806657, Busan, Republic of Korea, May 21-25, 2018, pp. 1-4.

* cited by examiner

DOWNLINK CONTROL INFORMATION (DCI) SIZE MATCHING

BACKGROUND

The 5th generation (5G) wireless access technology currently under development by members of the 3$^{rd}$-Generation Partnership Project (3GPP), known as new radio (NR), will address a variety of usage scenarios from enhanced mobile broadband (eMBB) to ultra-reliable low-latency communications (URLLC) to massive machine-type communications (mMTC). Key NR features include ultra-lean transmission, support for low latency, advanced antenna technologies, and spectrum flexibility including operation in high frequency bands, interworking between high and low frequency bands, and dynamic time division multiplexing (TDD).

Downlink control information (DCI) is used in NR to, among other things, transmit scheduling decisions from the gNB (3GPP terminology for an NR base station) to the UE (3GPP terminology for an access terminal, such as a mobile telephone or a machine-type communications (MTC) device. Different DCI formats are defined for different purposes, differing in, for example, the information carried in the DCI. According to the NR specifications, a UE blindly detects the DCI format based on (among other things) payload size and the RNTI used.

DCI size budget is a major constraint in NR specification to respect UE processing capability. This constraint is captured in 3GPP TS 38.212 as follows:

the total number of different DCI sizes [that a UE is] configured to monitor is no more than 4 for the cell, and the total number of different DCI sizes with C-RNTI [that a UE is] configured to monitor is no more than 3 for the cell.

The DCI formats supported in NR include:
DCI format 0_0: Scheduling of PUSCH in one cell
DCI format 0_1: Scheduling of PUSCH in one cell
DCI format 1_0: Scheduling of PDSCH in one cell
DCI format 1_1: Scheduling of PDSCH in one cell
DCI format 2_0: Notifying a group of UEs of the slot format
DCI format 2_1: Notifying a group of UEs of the PRB(s) and OFDM symbol(s) where UE may assume no transmission is intended for the UE
DCI format 2_2: Transmission of TPC commands for PUCCH and PUSCH
DCI format 2_3: Transmission of a group of TPC commands for SRS transmissions by one or more UEs The DCI formats 0_0 and 1_0 are usually referred to as fallback DCI. The DCI formats 0_1 and 1_1 are usually referred to as non-fallback DCI.

The UE blindly attempts to decode DCI messages using the RNTIs the UE is supposed to monitor. If the CRC checks, the DCI is correctly received and intended for this UE, and the UE thus follows the content of the DCI. If the CRC does not check, either the DCI was received in error or it was intended for another UE—in either case, the UE ignores it. Blindly detecting the DCI is done according to search spaces that can be configured in the UE. Search spaces can be either common search spaces (CSS) or UE-specific search spaces (USS). Not all RNTIs or DCI formats are allowed in all search spaces:

A common search space (CSS) can only be configured with fallback DCI formats 0_0 and 1_0

A given UE specific search space (USS) can be configured with either fallback DCI formats 0_0 and 1_0, or non-fallback DCI formats 0_1 and 1_1, but not both.

Hence, to support both fallback DCI formats 0_0 and 1_0, or non-fallback DCI formats 0_1 and 1_1 in USS, two USSs need to be configured: one USS for fallback DCI formats 0_0 and 1_0, and the other USS for non-fallback DCI formats 0_1 and 1_1

To indicate the UE addressed (and sometimes the purpose of the DCI), an identity, referred to as a Radio Network Temporary Identifier (RNTI) is included in the Cyclic Redundancy Check (CRC) of the DCI as transmitted. The RNTIs used to scramble the DCI CRC for each of the various formats are summarized in the below table.

| DCI format | RNTI |
| --- | --- |
| 0_0 | C-RNTI or CS-RNTI or MCS-C-RNTI TC-RNTI |
| 0_1 | C-RNTI or CS-RNTI or SP-CSI-RNTI or MCS-C-RNTI |
| 1_0 | C-RNTI or CS-RNTI or MCS-C-RNTI DCI scrambled by C-RNTI for PDCCH ordered random access has a different field description, compared to a corresponding DCI scrambled by C-RNTI for regular PDSCH transmission P-RNTI SI-RNTI RA-RNTI TC-RNTI |
| 1_1 | C-RNTI or CS-RNTI or MCS-C-RNTI |
| 2_0 | SFI-RNTI |
| 2_1 | INT-RNTI |
| 2_2 | TPC-PUSCH-RNTI or TPC-PUCCH-RNTI |
| 2_3 | TPC-SRS-RNTI |

A more detailed description of NR DCI can be found in Section 7.3.1 of 3GPP TS 38.212, v15.3.0.

To reduce device power consumption, a UE may be active on a wide bandwidth for a short time, e.g., in the event of bursty traffic, while being active on a narrow bandwidth for the remaining time. This is commonly referred to as bandwidth adaptation and is addressed in NR by a new concept known as bandwidth part (BWP). A BWP is a subset of contiguous RBs on the carrier. Up to four bandwidth parts can be configured in the UE for each of the UL and DL, but at a given time only one bandwidth part is active per transmission direction. Thus, the UE can receive on a narrow BWP and, when needed, the network can dynamically inform the UE to switch to a wider BWP for reception.

SUMMARY

The size of downlink control information (DCI) messages will vary, depending on the format and their contents. However, as noted above, the number of different DCI sizes that a given UE must monitor is limited, by a predetermined DCI size budget, to keep blind decoding procedures manageable. A consequence of this limited budget is that DCI sizes for various formats and purposes must be aligned with one another, so as to ensure that the number of different DCI sizes remains within the specified size budget.

The present disclosure provides several systematic DCI size matching procedures that provide exact instructions on how DCI size matching is to be performed. With these procedures, consistent and exact DCI size matching can be performed, ensuring common understanding of DCI contents between the UE and the network.

Embodiments of techniques disclosed herein include methods, implemented by a UE, for determining DCI sizes for monitoring by the UE. In some of these embodiments, the method comprises determining DCI sizes for monitoring by performing size matching between different DCI formats according to a "Rule 1" as described herein and according to any one or more of "Rule 2" through "Rule 9," as described herein. Rule 1 specifies that for a frequency domain resource allocation (FDRA) field in each DCI, the UE should use a field size that is a function of the size of a bandwidth part (BWP) wherein the size of the bandwidth part in the function is determined according to a first rule specifying that (i) the size of the BWP is the size of an active uplink BWP or an initial uplink BWP for a DCI format 0_0 monitored in a UE-specific search space (USS), (ii) the size of the BWP is the size of an initial uplink BWP for a DCI format 0_0 not monitored in a USS, (iii) the size of the BWP is the size of an active downlink BWP or an initial downlink BWP or CORESET 0 for a DCI format 1_0 monitored in a USS, (iv) the size of the BWP is the size of an initial downlink BWP for DCI format 1_0 not monitored in a USS, if CORESET 0 is not configured in the cell, and (v) the size of the BWP is the size of CORESET 0 for DCI format 1_0 not monitored in a USS, if CORESET 0 is configured in the cell.

Corresponding techniques disclosed herein include methods, implemented by a base station, for determining DCI sizes for monitoring by a UE served by the base station. In some of these embodiments, the method likewise comprises determining DCI sizes for monitoring by performing size matching between different DCI formats according to the "Rule 1" described herein and according to any one or more of "Rule 2" through "Rule 9," as described herein.

Other embodiments disclosed herein include UE and base station apparatuses for carrying out the methods summarized above.

DETAILED DESCRIPTION

Figure 1:
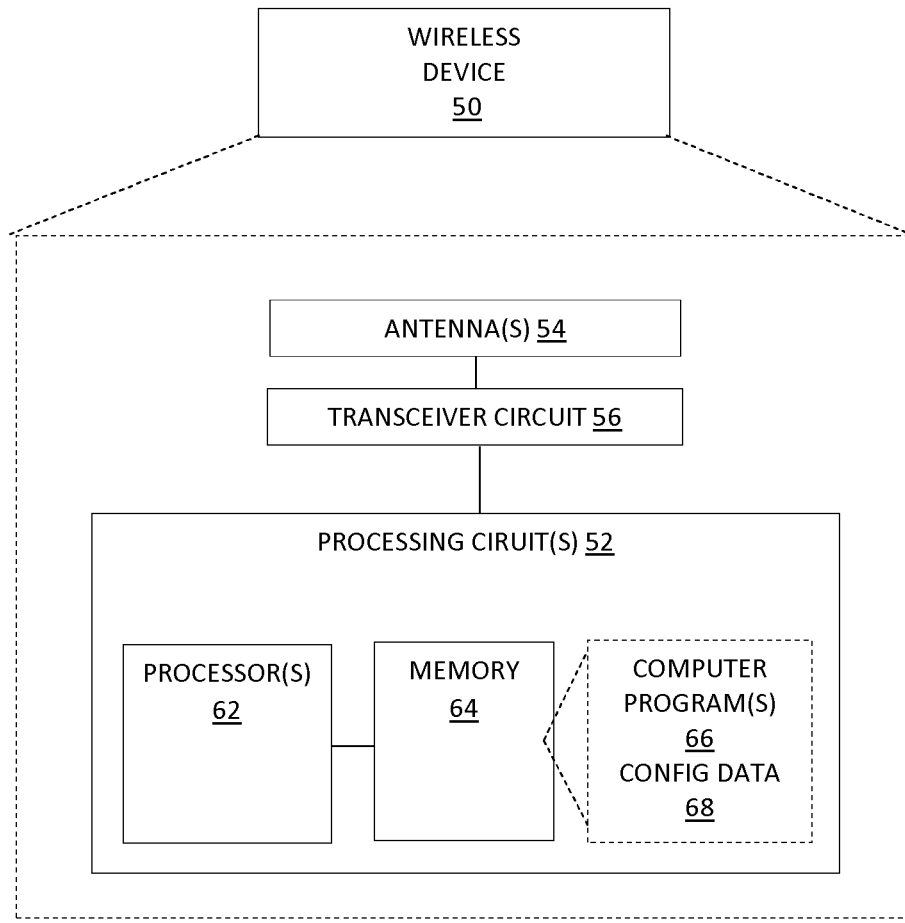
FIG. 1 illustrates an example user equipment (UE) or wireless device, according to some embodiments.

The description below applies to the DCI's monitored in an active BWP.

Also, for the padding terminology in the rules below, e.g., "Zeros are added to USS DCI 0_0 . . . ", it should be read as padding in general (could be zeros, could be ones, could be reserved), not only zeros.

Described below are several "rules" for use in performing DCI size matching, where each rule provides definitions and/or procedures to be followed for determining DCI sizes, while remaining within the predetermined DCI size budget mentioned above. The rules described below may be implemented by a UE, for determining DCI sizes when performing blind decoding and demodulation of DCI messages, as well as by a base station, e.g., a gNB, when assembling and transmitting DCI messages to one or more UEs. The use of these rules in a consistent manner ensures that the UEs and the gNBs have a common understanding of the DCI formats, contents, and structure.

Each of several of the rules below are targeted to specific configurations, e.g., with respect to whether fallback DCI formats are configured for a common search space (CSS) or UE-specific search space (USS). Thus, various embodiments and implementations of the presently disclosed techniques may incorporate one, several, or all of these rules. In some cases below, such as with "Rule 7," alternative versions of the rule are presented—a given embodiment may implement one of these alternatives. Thus, some embodiments may implement each of the rules below, implementing a single alternative for those rules that are presented with several alternatives. It should be understood, however, that a given embodiment might not implement all of the rules below. A different rule may be substituted for one or more of the below, e.g., for a particular configuration.

Rule 0 specifies a DCI budget size constraint, which the other rules seek to maintain. Rule 1 does not specify a complete rule for DCI sizing, but defines parameters that are used to determine a field size in the DCI, which field size influences the DCI size in each of the subsequent rules. Several embodiments combine rule 1 with any or all of the subsequent Rules 2_9. An example of a combined rule, according to some embodiments, is also provided below.

Each of several of the rules defined below is accompanied by a "motivation." These should be understood to provide context and/or justification for the rules but are not limiting.

1.1 Rule 0—Extension of DCI Size Budget

Motivation: The current DCI size budget description is restricted to C-RNTI. This shall be extended to cover CS-RNTI or SP-CSI-RNTI or MCS-C-RNTI.

Rule Description:

The "3+1" DCI budget is extended as follows:
- the total number of different DCI sizes configured to monitor is no more than 4 for the cell (the "4-part" of the budget), and
- the total number of different DCI sizes with C-RNTI or CS-RNTI (if configured) or SP-CSI-RNTI (if configured) or MCS-C-RNTI (if configured) configured to monitor is no more than 3 for the cell (the "3-part" of the budget).

1.2 Rule 1—Size of FDRA Field in Fallback DCI 0_0 and 1_0 Motivation: In the current field description of FDRA field in fallback DCI 0_0, the size of FDRA (Frequency Domain Resource Assignment) field is a function of the size of the active UL BWP, if DCI 0_0 is monitored in USS and provided that the size budget (in terms of the number of DCI sizes that must be monitored) is satisfied; otherwise the size of FDRA field is given by the initial UL BWP.

In the current field description of FDRA field in fallback DCI 1_0, the size of FDRA field is a function of the size of the DL BWP, if DCI 1_0 is monitored in USS and provided that the size budget is satisfied; otherwise the size of FDRA field is given by the CORESET #0 if CORESET #0 is present and given by the initial DL BWP if CORESET #0 is not present.

Embedding part of the size matching procedure within the FDRA field description in fallback DCI 0_0 and 1_0 makes the size matching procedure as a whole unclear. In this rule, this issue is cleaned up.

Rule Description:

For the field description of FDRA field in fallback DCI 0_0, $N_{RB}^{UL,BWP}$ is the size of the active UL bandwidth part, unless according to the DCI size matching procedure described in another rule, $N_{RB}^{UL,BWP}$ is the size of the initial UL bandwidth part, in case DCI format 0_0 is monitored in the UE specific search space; otherwise, $N_{RB}^{UL,BWP}$ is the size of the initial UL bandwidth part.

For the field description of FDRA field in fallback DCI 1_0, $N_{RB}^{DL,BWP}$ is the size of the active DL bandwidth part, unless according to the DCI size matching procedure described in another rule $N_{RB}^{DL,BWP}$ is the size of CORESET 0 if CORESET 0 is configured for the cell and $N_{RB}^{DL,BWP}$ is the size of initial DL bandwidth part if CORESET 0 is not configured for the cell, in case DCI format 1_0 is monitored in the UE specific search space; otherwise, $N_{RB}^{DL,BWP}$ is the size of CORESET 0 if CORESET 0 is configured for the cell and $N_{RB}^{DL,BWP}$ is the size of initial DL bandwidth part if CORESET 0 is not configured for the cell.

1.3 Rule 2—Initial Alignment of Non-Fallback DCI 0_1 and 1_1

Motivation: Non-fallback DCI 0_1 may be scrambled with C-RNTI or CS-RNTI or SP-CSI-RNTI or MCS-C-RNTI, and may be used to schedule SUL and non-SUL. Non-fallback DCI 1_1 may be scrambled with C-RNTI or CS-RNTI or MCS-C-RNTI. It is necessary to align the size of each smaller DCI 0_1 to the maximum size of DCI 0_1; likewise, the size of each smaller DC 1_1 must be aligned to the maximum size of DCI 1_1.

Rule Description:
If non-fallback DCI is configured in USS
  Zero padding is added to all smaller DCI 0_1's until their sizes equal the maximum size of DCI 0_1
  Zero padding is added to all smaller DCI 1_1's until their sizes equal the maximum size of DCI 1_1
end 1.4 Rule 3—Fallback DCI is NOT Configured in CSS and is Configured in USS Motivation: This may be a possible configuration for SCell, where CSS is not configured for fallback DCI. In this case:

If non-fallback DCI is not configured, the total number of different DCI sizes with C-RNTI or
CS-RNTI (if configured) or SP-CSI-RNTI (if configured) or MCS-C-RNTI (if configured) configured to monitor is no more than 2 for the cell.

If non-fallback DCI is configured, the total number of different DCI sizes with C-RNTI or CS-RNTI (if configured) or SP-CSI-RNTI (if configured) or MCS-C-RNTI (if configured) configured to monitor is no more than 4 for the cell.

In either case, USS DCI 0_0 size and USS 1_0 size should be matched, which would guarantee the size budget is met. Two different approaches are detailed below, in rules 3-a and 3-b. Note that as discussed in the background section above, when both fallback DCI and non-fallback DCI are configured in USS, as may be the case for both Rule 3-a and Rule 3-b, they are necessarily in different USSs.

Rule 3-a Description:
If fallback DCI is NOT configured in CSS and is configured in USS
  If USS DCI 0_0 size<USS DCI 1_0 size
    Zeros are added to USS DCI 0_0 until USS DCI 0_0 size=USS DCI 1_0 size
  If USS DCI 0_0 size>USS DCI 1_0 size
    Zeros are added to USS DCI 1_0 until USS DCI 0_0 size=USS DCI 1_0 size
  If non-fallback DCI is configured in USS
    (Note: Below takes care of adding 1 bit to non-fallback DCI in case that non-fallback DCI happens to be the same size of USS fallback DCI.)
    If DCI 0_1 size=USS DCI 0_0/1_0 size
      A zero is appended to the end of DCI 0_1
    If DCI 1_1 size=USS DCI 0_0/1_0 size
      A zero is appended to the end of DCI 1_1
  end
end Rule 3-b Description (Difference Vs. Rule 3-a is Underlined):
If fallback DCI is NOT configured in CSS and is configured in USS
  If USS DCI 0_0 size<USS DCI 1_0 size
    Zeros are added to USS DCI 0_0 until USS DCI 0_0 size=USS DCI 1_0 size
  If USS DCI 0_0 size>USS DCI 1_0 size
    MSB(s) of FDRA in USS DCI 0_0 are truncated until USS DCI 0_0 size=USS DCI 1_0 size
  If non-fallback DCI is configured in USS
    (Note: Below takes care of adding 1 bit to non-fallback DCI in case that non-fallback DCI happens to be the same size of USS fallback DCI)
    If DCI 0_1 size=USS DCI 0_0/1_0 size
      A zero is appended to the end of DCI 0_1
    If DCI 1_1 size=USS DCI 0_0/1_0 size
      A zero is appended to the end of DCI 1_1
  end
end 1.5 Rule 4—Fallback DCI is Configured in CSS Motivation: This is a typical configuration, especially for PCell and PSCell. The sizes of fallback DCI 0_0 and 1_0 should be aligned.

Rule 4-a Description:
If fallback DCI is configured in CSS
  Determine CSS DCI 1_0 size according to CORESET #0 (if CORESET #0 is present) or initial DL BWP (if CORESET #0 is not present)
  Determine CSS DCI 0_0 size according to initial UL BWP
  If CSS DCI 0_0 size<CSS DCI 1_0 size
    Zeros are added to CSS DCI 0_0 until CSS DCI 0_0 size=CSS DCI 1_0 size
  If CSS DCI 0_0 size>CSS DCI 1_0 size
    MSB(s) of FDRA in CSS DCI 0_0 are truncated until CSS DCI 0_0 size=CSS DCI 1_0 size
end Rule 4-b Description (Difference Vs. Rule 4-a is Underlined):
If fallback DCI is configured in CSS
  Determine CSS DCI 1_0 size according to CORESET #0 (if CORESET #0 is present) or initial DL BWP (if CORESET #0 is not present)
  Determine CSS DCI 0_0 size according to initial UL BWP
  If CSS DCI 0_0 size<CSS DCI 1_0 size
    Zeros are added to CSS DCI 0_0 until CSS DCI 0_0 size=CSS DCI 1_0 size
  If CSS DCI 0_0 size>CSS DCI 1_0 size
    Zeros are added to CSS DCI 1_0 until CSS DCI 0_0 size=CSS DCI 1_0 size
end 1.6 Rule 5—Fallback DCI is Configured in CSS+Fallback DCI is Configured in USS+Non-Fallback DCI is NOT Configured in USS Motivation: DCI size budget (the 3-part of the budget) is satisfied, but USS DCI 0_0 size and USS 1_0 size should still be matched per Rules 5-a or 5-b. For completeness, rule 5-c is included to cover the case without size matching.

Rule 5-a Description:
Execute rule 4a or 4b first

If USS DCI 00 size<USS DCI 10 size
  Zeros are added to USS DCI 00 until USS DCI 00 size=USS DCI 10 size
If USS DCI 00 size>USS DCI 10 size
  Zeros are added to USS DCI 10 until USS DCI 00 size=USS DCI 10 size Rule 5-b Description (Difference Vs. Rule 5-a is Underlined):
  Execute rule 4a or 4b first
  If USS DCI 0_0 size<USS DCI 1_0 size
    Zeros are added to USS DCI 0_0 until USS DCI 0_0 size=USS DCI 1_0 size
  If USS DCI 0_0 size>USS DCI 1_0 size
    MSB(s) of FDRA in USS DCI 0_0 are truncated until USS DCI 0_0 size=USS DCI 1_0 size Rule 5-c Description:
  Execute rule 4a or 4b first
  No size matching of USS DCI 0_0 and USS DCI 1_0

1.7 Rule 6—Fallback DCI is Configured in CSS+Fallback DCI is not Configured in USS+Non-Fallback DCI is Configured in USS Motivation: In this case, DCI size budget (the "3" part) is satisfied, and no size matching for non-fallback DCI. Note that adding 1 bit to non-fallback DCI applies only if non-fallback DCI happens to be the same size as USS fallback DCI, which is not present under this case.

Rule 6 Description:
  Execute rule 4a or 4b first
  No size matching of USS DCI 0_1 and USS DCI 1_1

1.8 Rule 7—Fallback DCI is Configured in CSS+Fallback DCI is Configured in USS+Non-Fallback DCI is Configured in USS Motivation: This is the most complicated case; in general DCI size budget (the "3" part) is not satisfied, but in corner cases it may be satisfied.

There are at least 2 ways to size match.
  Method 1: first trigger procedure given in DCI field description so that FDRA of USS DCI 0_0 is given by initial UL BWP, and FDRA of USS DCI 1_0 is given by CORESET #0 (if CORESET #0 is present) or initial DL BWP (if CORESET #0 is not present); check size budget again; in corner cases, it may be satisfied; in general cases, it's not satisfied. However, USS DCI 0_0 size and USS 1_0 size should be matched. So without the need to check DCI size budget, we could further match USS DCI 0_0 size and USS 1_0 size.
  Method 2: match USS DCI 0_0 size to CSS DCI 1_0 size; match USS DCI 1_0 size to CSS DCI 1_0 size.

With method 1 or 2, DCI size matching can be performed according to rule 7-c or 7-d using the rule 7-a or 7-b as a building block.

Rule 7-a Description for Method 1 (as a Building Block for Rule 7-c/7-cc/7-d)
  FDRA of USS DCI 0_0 is given by (i.e., a function of) initial UL BWP
  FDRA of USS DCI 1_0 is given by CORESET #0 (if CORESET #0 is present) or initial DL BWP (if CORESET #0 is not present)
  If USS DCI 0_0 size<USS DCI 1_0 size (which is of the same size as CSS DCI 1_0)
    Zeros are added to USS DCI 0_0 until USS DCI 0_0 size=USS DCI 1_0 size
  If USS DCI 0_0 size>USS DCI 1_0 size (which is of the same size as CSS DCI 1_0)
    MSB(s) of FDRA in USS DCI 0_0 are truncated until USS DCI 0_0 size=USS DCI 1_0 size Rule 7-b Description for Method 2 (as a Building Block for Rule 7-c/7-cc/7-d)
  If USS DCI 0_0 size<CSS DCI 1_0 size
    Zeros are added to USS DCI 0_0 until USS DCI 0_0 size=CSS DCI 1_0 size
  If USS DCI 0_0 size>CSS DCI 1_0 size
    MSB(s) of FDRA in USS DCI 0_0 are truncated until USS DCI 0_0 size=CSS DCI 1_0 size
  If USS DCI 1_0 size<CSS DCI 1_0 size
    Zeros are added to USS DCI 1_0 until USS DCI 1_0 size=CSS DCI 1_0 size
  If USS DCI 1_0 size>CSS DCI 1_0 size
    MSB(s) of FDRA in USS DCI 1_0 are truncated until USS DCI 1_0 size=CSS DCI 1_0 size Rule 7-c Description:
Execute rule 4a or 4b first
If DCI size budget (the "3" part) is not satisfied (before padding)
  Execute either rule 7-a or 7-b
  (Note: Below takes care of adding 1 bit to non-fallback DCI)
  If DCI 0_1 size=USS DCI 0_0/1_0 size
    A zero is appended to the end of DCI 0_1
  If DCI 1_1 size=USS DCI 0_0/1_0 size
    A zero is appended to the end of DCI 1_1
Elseif DCI size budget (the "3" part) is satisfied in corner cases (before padding)
  (Note: USS DCI 0_0 size and USS 1_0 size should still be matched)
  If USS DCI 0_0 size<USS DCI 1_0 size
    Zeros are added to USS DCI 0_0 until USS DCI 0_0 size=USS DCI 1_0 size
  If USS DCI 0_0 size>USS DCI 1_0 size
    Zeros are added to USS DCI 1_0 until USS DCI 0_0 size=USS DCI 1_0 size
  (Note: Below takes care of adding 1 bit to non-fallback DCI)
  If DCI 0_1 size=USS DCI 0_0/1_0 size
    A zero is appended to the end of DCI 0_1
  If DCI 1_1 size=USS DCI 0_0/1_0 size
    A zero is appended to the end of DCI 1_1
  (Note: Now we need to check DCI size budget again)
  If DCI size budget is not satisfied
    [Note: below are SAME PROCEDURE AS DESCRIBED ABOVE UNDER "If DCI size budget is not satisfied"]
    Execute either rule 7-a or 7-b
    (Note: Below takes care of adding 1 bit to non-fallback DCI)
    If DCI 0_1 size=USS DCI 0_0/1_0 size
      A zero is appended to the end of DCI 0_1
    If DCI 1_1 size=USS DCI 0_0/1_0 size
      A zero is appended to the end of DCI 1_1
  End
End Rule 7-cc Description (Changes Vs. Rule 7-c are Underlined)
Execute rule 4a or 4b first
If DCI size budget (the "3" part) is not satisfied (before padding)
  Execute either rule 7-a or 7-b
  (Note: Below takes care of adding 1 bit to non-fallback DCI)
  If DCI 0_1 size=USS DCI 0_0/1_0 size
    A zero is appended to the end of DCI 0_1
  If DCI 1_1 size=USS DCI 0_0/1_0 size
    A zero is appended to the end of DCI 1_1

Elseif DCI size budget (the "3" part) is satisfied in corner cases (before padding)
  (Note: USS DCI 0_0 size and USS 1_0 size should still be matched)
  If USS DCI 0_0 size<USS DCI 1_0 size
    Zeros are added to USS DCI 0_0 until USS DCI 0_0 size=USS DCI 1_0 size
  If USS DCI 0_0 size>USS DCI 1_0 size
    Zeros are added to USS DCI 1_0 until USS DCI 0_0 size=USS DCI 1_0 size
  (Note: Below takes care of adding 1 bit to non-fallback DCI)
  If DCI 0_1 size=USS DCI 0_0/1_0 size
    A zero is appended to the end of DCI 0_1
  If DCI 1_1 size=USS DCI 0_0/1_0 size
    A zero is appended to the end of DCI 1_1
  (Note: Now we need to check DCI size budget again)
  If DCI size budget is not satisfied
    If added, remove the added 1 bit in the non-fallback DCI 0_1
    If added, remove the added 1 bit in the non-fallback DCI 1_1
    Execute either rule 7-a or 7-b
    (Note: Below takes care of adding 1 bit to non-fallback DCI. It looks like this wouldn't happen in this corner-corner case, but it's safer to do a simple check and adding 1 bit if necessary)
    If DCI 0_1 size=USS DCI 0_0/1_0 size
      A zero is appended to the end of DCI 0_1
    If DCI 1_1 size=USS DCI 0_0/1_0 size
      A zero is appended to the end of DCI 1_1
  End
End
Comment on rule 7-c or 7-cc: The above procedure is complicated. A simplified approach would be regardless of whether DCI size budget (before padding) is satisfied or not, simply carry out the following procedure per rule 7-d:
Rule 7-d Description:
Execute rule 4a or 4b first
Execute either rule 7-a or 7-b
(Note: Below takes care of adding 1 bit to non-fallback DCI)
If DCI 0_1 size=USS DCI 0_0/1_0 size
  A Zero is appended to the end of DCI 0_1
If DCI 1_1 size=USS DCI 0_0/1_0 size
  A Zero is appended to the end of DCI 1_1
1.9 Rule 8—Alignment of DCI 2_0 and DCI 2_1
Motivation: If both DCI 2_0 and DCI 2_1 are configured, it is good to align their size if DCI budget is not satisfied.
Rule 8 Description:
If both DCI 2_0 and DCI 2_1 are configured
  If DCI size budget is not satisfied
    If DCI 2_0 size<DCI 21 size
      Zeros are appended to the end of DCI 2_0 until DCI 2_0 size=DCI 2_1 size
    If DCI 2_0 size>DCI 2_1 size
      Zeros are appended to the end of DCI 2_1 until DCI 2_0 size=DCI 2_1 size
  end
end
1.10 Rule 9—Alignment of DCI 2_2 and DCI 2_3
Motivation: If DCI 2_2 or DCI 2_3 are configured, it is good to align their sizes to DCI 1_0/0_0 in CSS if DCI budget is not satisfied.
Rule 9 Description:
If DCI 2_2 is configured
  If DCI size budget is not satisfied
    UE is not expected to be configured with DCI 2_2 size larger than the size of DCI 1_0 in CSS
    If DCI 2_2 size<CSS DCI 1_0 size
      Zeros are appended to the end of DCI 2_2 until DCI 2_2 size=CSS DCI 1_0 size
    end
  end
end
If DCI 2_3 is configured
  If DCI size budget is not satisfied
    UE is not expected to be configured with DCI 2_3 size larger than the size of DCI 1_0 in CSS
    If DCI 2_3 size<CSS DCI 1_0 size
      Zeros are appended to the end of DCI 2_3 until DCI 2_3 size=CSS DCI 1_0 size
    end
  end
end
1.11 Combined Rule
Depending on configuration, Rules 1 to 9 can be applied accordingly.
Below shows one example combination of the rules 1 to 9.
Example Combined Rule Description:
If non-fallback DCI is configured in USS
  Zero padded to all smaller DCI 0_1 's until their sizes equal the maximum size of DCI 0_1
  Zero padded to all smaller DCI 1_1 's until their sizes equal the maximum size of DCI 1_1
end
If fallback is NOT configured in CSS and is configured in USS
  If USS DCI 0_0 size<USS DCI 1_0 size
    Zeros are added to USS DCI 0_0 until USS DCI 0_0 size=USS DCI 1_0 size
  If USS DCI 0_0 size>USS DCI 1_0 size
    Zeros are added USS DCI 1_0 until USS DCI 0_0 size=USS DCI 1_0 size
  If non-fallback DCI is configured in USS
    If DCI 0_1 size=USS DCI 0_0/1_0 size
      A zero is appended to the end of DCI 0_1
    If DCI 1_1 size=USS DCI 0_0/1_0 size
      A zero is appended to the end of DCI 1_1
  end
end
If fallback DCI is configured in CSS
  Determine CSS DCI 1_0 size according to CORESET #0 (if CORESET #0 is present) or initial DL BWP (if CORESET #0 is not present)
  Determine CSS DCI 0_0 size according to initial UL BWP
  If CSS DCI 0_0 size<CSS DCI 1_0 size
    Zeros are added to CSS DCI 0_0 until CSS DCI 0_0 size=CSS DCI 1_0 size
  If CSS DCI 0_0 size>CSS DCI 1_0 size
    MSB(s) of FDRA in CSS DCI 0_0 are truncated until CSS DCI 0_0 size=CSS DCI 1_0 size (Note: this is current spec.)
  Switch:
    Case 1: Fallback DCI is configured in USS+non-fallback DCI is NOT configured in USS
      If USS DCI 0_0 size<USS DCI 1_0 size
        Zeros are added to USS DCI 0_0 until USS DCI 0_0 size=USS DCI 1_0 size
      If USS DCI 0_0 size>USS DCI 1_0 size
        Zeros are added to USS DCI 1_0 until USS DCI 0_0 size=USS DCI 1_0 size Case 2: Fallback DCI is NOT configured in USS+
non-fallback DCI is configured in USS
  No size matching needed in this case
Case 3: Fallback DCI is configured in USS+non-fallback DCI is configured in USS
  FDRA of USS DCI 0_0 is given by initial UL BWP
  FDRA of USS DCI 1_0 is given by CORESET #0 (if CORESET #0 is present) or initial DL BWP (if CORESET #0 is not present)
  If USS DCI 0_0 size<USS DCI 1_0 size (which is of the same size as CSS DCI 1_0)
    Zeros are added to USS DCI 0_0 until USS DCI 0_0 size=USS DCI 1_0 size
  If USS DCI 0_0 size>USS DCI 1_0 size (which is of the same size as CSS DCI 1_0)
    MSB(s) of FDRA in USS DCI 0_0 are truncated until USS DCI 0_0 size=USS DCI 1_0 size
  If DCI 0_1 size=USS DCI 0_0/1_0 size
    A zero is appended to the end of DCI 0_1
  If DCI 1_1 size=USS DCI 0_0/1_0 size
    A zero is appended to the end of DCI 1_1
    end
  end
If both DCI 2_0 and DCI 2_1 are configured
  If DCI size budget is not satisfied
    If DCI 2_0 size<DCI 2_1 size
      Zeros are appended to the end of DCI 2_0 until DCI 2_0 size=DCI 2_1 size
    If DCI 2_0 size>DCI 2_1 size
      Zeros are appended to the end of DCI 2_1 until DCI 2_0 size=DCI 2_1 size
    end
  end
If DCI 2_2 is configured
  If DCI size budget is not satisfied
    UE is not expected to be configured with DCI 2_2 size larger than the size of DCI 1_0 in CSS
    If DCI 2_2 size<CSS DCI 1_0 size
      Zeros are appended to the end of DCI 2_2 until DCI 2_2 size=CSS DCI 1_0 size
    end
  end
end
If DCI 2_3 is configured
  If DCI size budget is not satisfied
    UE is not expected to be configured with DCI 2_3 size larger than the size of DCI 1_0 in CSS
    If DCI 2_3 size<CSS DCI 1_0 size
      Zeros are appended to the end of DCI 2_3 until DCI 2_3 size=CSS DCI 1_0 size
    end
  end
end FIG. 1 illustrates a diagram of an example of a user equipment (UE), illustrated as a wireless device 50, according to some embodiments. The wireless device 50 can be any type of wireless device capable of communicating with a network node or another wireless device (e.g., UE) over radio signals. The wireless device 50 may also be radio communication device, target device, device to device (D2D) UE, V2X UE, ProSe UE, machine type UE or UE capable of machine to machine communication (M2M), a sensor equipped with UE, PDA (personal digital assistant), iPAD, Tablet, mobile terminals, smart phone, laptop embedded equipment (LEE), laptop mounted equipment (LME), USB dongles, Customer Premises Equipment (CPE), etc.

The wireless device 50 communicates with a radio node or base station via antennas 54 and a transceiver circuit 56. The transceiver circuit 56 may include transmitter circuits, receiver circuits, and associated control circuits that are collectively configured to transmit and receive signals according to a radio access technology, for the purposes of providing cellular communication services.

The wireless device 50 also includes one or more processing circuits 52 that are operatively associated with the radio transceiver circuit 56. The processing circuitry 52 comprises one or more digital processing circuits 62, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuitry 52 may comprise fixed circuitry, or programmable circuitry that is specially adapted via the execution of program instructions implementing the functionality taught herein, or may comprise some mix of fixed and programmed circuitry. The processing circuitry 52 may be multi-core.

The processing circuitry 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuitry 52 and/or separate from the processing circuitry 52. In general, the memory 64 comprises one or more types of computer-readable storage media providing non-transitory storage of the computer program 66 and any configuration data 68 used by the wireless device 50. Here, "non-transitory" means permanent, semi-permanent, or at least temporarily persistent storage and encompasses both long-term storage in non-volatile memory and storage in working memory, e.g., for program execution.

The wireless device 50, e.g., using the processing circuitry 52, may be configured to perform all or some of the techniques described above. For example, the processor 62 of the processor circuitry 52 may execute a computer program 66 stored in the memory 64 that configures the processor 62 to determine DCI sizes for monitoring by the wireless device, by performing size matching between different DCI formats according to rule 1 as described herein and according to any one or more of rules 2_9 as described herein.

Figure 2:
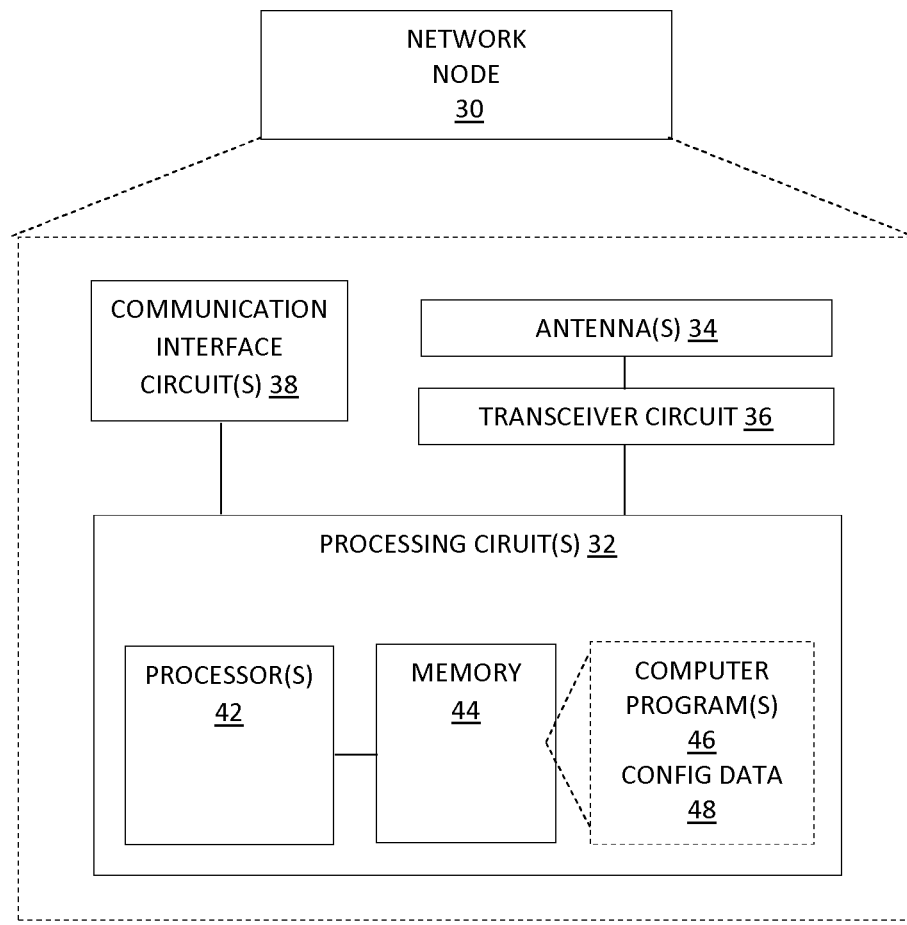
FIG. 2 illustrates an example network node, e.g., a base station, according to some embodiments.

FIG. 2 illustrates a diagram of a network node 30, such as a base station, that can determine DCI sizes to be monitored by the wireless device 50 and other devices, according to some embodiments. The network node 30 facilitates communication between wireless devices and the core network. Network node is a more general term and can correspond to any type of radio network node or any network node, which communicates with a UE and/or with another network node. Examples of network nodes are NodeB, base station (BS), multi-standard radio (MSR) radio node such as MSR BS, eNodeB, gNodeB. MeNB, SeNB, network controller, radio network controller (RNC), base station controller (BSC), road side unit (RSU), relay, donor node controlling relay, base transceiver station (BTS), access point (AP), transmission points, transmission nodes, RRU, RRH, nodes in distributed antenna system (DAS), core network node (e.g. MSC, MME, etc), O&M, OSS, SON, positioning node (e.g. E-SMLC) etc.

The network node 30 includes communication interface circuitry 38 that includes circuitry for communicating with other nodes in the core network, radio nodes, and/or other types of nodes in the network for the purposes of providing data and cellular communication services. The network node 30 communicates with wireless devices via antennas 34 and transceiver circuitry 36. The transceiver circuitry 36 may include transmitter circuits, receiver circuits, and associated control circuits that are collectively configured to transmit and receive signals according to a radio access technology, for the purposes of providing cellular communication services.

The network node 30 also includes one or more processing circuits 32 that are operatively associated with the communication interface circuitry 38 and/or the transceiver circuitry 36. The network node 30 uses the communication interface circuitry 38 to communicate with network nodes and the transceiver circuitry 36 to communicate with user equipments. For ease of discussion, the one or more processing circuits 32 are referred to hereafter as "the processing circuitry 32." The processing circuitry 32 comprises one or more digital processors 42, e.g., one or more microprocessors, microcontrollers, DSPs, FPGAs, CPLDs, ASICs, or any mix thereof. More generally, the processing circuitry 32 may comprise fixed circuitry, or programmable circuitry that is specially configured via the execution of program instructions implementing the functionality taught herein, or may comprise some mix of fixed and programmed circuitry. The processor 42 may be multi-core, i.e., having two or more processor cores utilized for enhanced performance, reduced power consumption, and more efficient simultaneous processing of multiple tasks.

The processing circuitry 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuitry 32 and/or separate from the processing circuitry 32. In general, the memory 44 comprises one or more types of computer-readable storage media providing non-transitory storage of the computer program 46 and any configuration data 48 used by the network node 30.

The processing circuitry 32 is also configured, in some embodiments, to determine DCI sizes to be monitored by the UE by performing size matching between different DCI formats according to rule 1 as described herein and according to any one or more of rules 2_9 as described herein.

Figure 3:
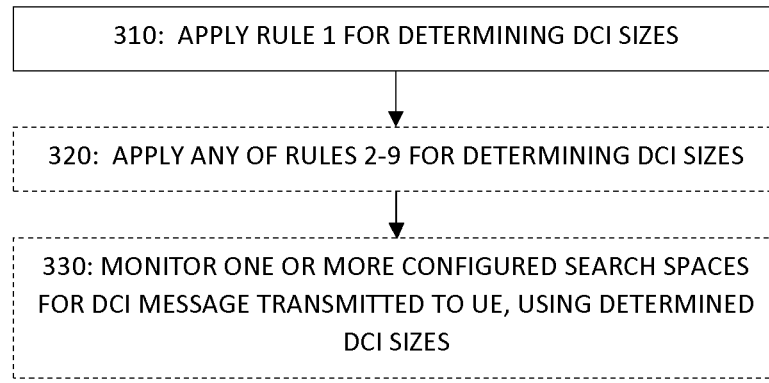
FIG. 3 is a process flow diagram illustrating an example method implemented by a UE, according to some embodiments.

FIG. 3 illustrates a process flow diagram for an example method according to some of the techniques described herein. The method illustrated in FIG. 3 includes the application by a UE of Rule 1, as described above, and optionally includes the application of any one or more of Rules 2_9, as well.

As shown at block 310, the UE applies Rule 1. According to this rule, for a frequency domain resource allocation (FDRA) field in each DCI format, the UE uses a field size that is a function of the size of a bandwidth part (BWP), wherein the size of the bandwidth part in the function is determined according to a first rule specifying that (i) the size of the BWP is the size of an active uplink BWP or an initial uplink BWP for a DCI format 0_0 monitored in a UE-specific search space (USS), (ii) the size of the BWP is the size of an initial uplink BWP for a DCI format 0_0 not monitored in a USS, (iii) the size of the BWP is the size of an active downlink BWP or an initial downlink BWP or CORESET 0 for a DCI format 1_0 monitored in a USS, (iv) the size of the BWP is the size of an initial downlink BWP for DCI format 1_0 not monitored in a USS, if CORESET 0 is not configured in the cell, and (v) the size of the BWP is the size of CORESET 0 for DCI format 1_0 not monitored in a USS, if CORESET 0 is configured in the cell.

As shown at block 320, the UE applies any one or more of Rules 2_9, as described above.

This may comprise, for example, for each DCI format 0_1 and 1_1 monitored in a USS, applying a second rule specifying that (i) zero padding is added to a DCI format 0_1 smaller than a maximum size of DCI format 0_1, until the size of the DCI format 0_1 is equal to the maximum size of DCI format 0_1, and (ii) zero padding is added to a DCI format 1_1 smaller than a maximum size of DCI format 1_1, until the size of the DCI format 1_1 is equal to the maximum size of DCI format 1_1.

In some embodiments, this may comprise, for each DCI format 0_0 and DCI format 1_0 monitored in a first USS, applying a third rule specifying that (i) if the size of the DCI format 0_0 is smaller than the size of a DCI format 1_0 configured to be monitored by the UE in the first USS, zeroes are added to the DCI format 0_0 until the size of the DCI format 0_0 equals the size of DCI format 1_0 configured to be monitored by the UE in the first USS, (ii) if the size of the DCI format 1_0 is smaller than the size of a DCI format 0_0 configured to be monitored by the UE in the first USS, zeroes are added to the DCI format 1_0 until the size of the DCI format 1_0 equals the size of the DCI format 0_0 configured to be monitored by the UE in the first USS, (iii) if the size of any DCI format 0_1 monitored in a USS other than the first USS is the same as the size of the DCI format 0_0 configured to be monitored by the UE in the first USS or the size of the DCI format 1_0 configured to be monitored by the UE in the first USS, a zero is appended to the end of the DCI format 0_1, and (iv) if the size of any DCI format 1_1 monitored in a USS other than the first USS is the same as the size of the DCI format 0_0 configured to be monitored by the UE in the first USS or the size of the DCI format 1_0 configured to be monitored by the UE in the first USS, a zero is appended to the end of the DCI format 1_1.

In some embodiments, this may comprise, for each DCI format 0_0 and DCI format DCI 1_0 monitored in a common search space (CSS), applying a fourth rule specifying that (i) if the size of the DCI format 0_0 monitored in the CSS is less than the size of a DCI format 1_0 monitored in the CSS, zeroes are added to the DCI format 0_0 monitored in the CSS until the size of the DCI format 0_0 monitored in the CSS is equal to the size of the DCI format 1_0 monitored in the CSS, and (ii) if the size of the DCI format 1_0 monitored in the CSS is less than the size of a DCI format 0_0 monitored in the CSS, most significant bits of the FDRA field in the DCI format 0_0 are truncated until the size of the DCI format 0_0 monitored in the CSS is equal to the size of the DCI format 1_0 monitored in the CSS. In some of these embodiments, this may further comprise, after applying the fourth rule, applying a fifth rule specifying that, for each DCI format 0_0 monitored in a USS, if the size of the DCI format 0_0 monitored in the USS is less than the size of a DCI format 1_0 monitored in the USS, zeroes are added to the DCI format 0_0 monitored in the USS until the size of the DCI format 0_0 monitored in the USS is equal to the size of the DCI format 1_0 monitored in the USS; and for each DCI format 1_0 monitored in a USS, if the size of the DCI format 1_0 monitored in the USS is less than the size of a DCI format 0_0 monitored in the USS, zeroes are added to the DCI format 1_0 monitored in the USS until the size of the DCI format 1_0 monitored in the USS is equal to the size of the DCI format 0_0 monitored in the USS.

In some embodiments, the method may comprise, responsive to (i) DCI format 0_0 or DCI format 1_0 being configured for monitoring by the UE in a common search space (CSS), and (ii) DCI format 0_0 or DCI format 1_0 being configured for monitoring by the UE in a first USS, and (iii) DCI format 0_1 or DCI format 1_1 being configured for monitoring by the UE in a second USS, applying a sixth rule specifying that: for each DCI format 0_0 monitored in the CSS, the field size for the FDRA field is determined as a function of the initial uplink BWP; for each DCI format 1_0 monitored in the CSS, the field size for the FDRA field is determined as a function of the size of CORESET 0, if CORESET 0 is present, or as a function of the size of the initial downlink BWP, if CORESET 0 is not present; for each DCI format 0_0 monitored in the first USS, if the size of the DCI format 0_0 is smaller than the size of the DCI format 1_0 monitored in the first USS, zeroes are added to the DCI format 0_0 monitored in the first USS until the size of the DCI format 0_0 monitored in the first USS is equal to the size of the DCI format 1_0 monitored in the first USS; and for each DCI format 0_0 monitored in the first USS, if the size of the DCI format 0_0 is greater than the size of the DCI format 1_0 monitored in the first USS, most significant bits of the FDRA field of the DCI format 0_0 monitored in the first USS are truncated until the size of the DCI format 0_0 monitored in the first USS is equal to the size of the DCI format 1_0 monitored in the first USS.

In some embodiments, responsive to (i) DCI format 0_0 or DCI format 1_0 being configured for monitoring by the UE in a common search space, CSS, and (ii) DCI format 0_0 or DCI format 1_0 being configured for monitoring by the UE in a first USS, and (iii) DCI format 0_1 or DCI format 1_1 being configured for monitoring by the UE in a second USS, the method may comprise, after applying the fourth rule, applying a seventh rule according to Rule 7cc described above.

In some embodiments, the method may comprise, responsive to both DCI format 2_0 and DCI format 2_1 being configured for monitoring, applying an eighth rule specifying that: for each DCI format 2_0, if a size budget limiting a number of DCI sizes the UE can be configured to monitor would otherwise be exceeded and if the size of the DCI format 2_0 is less than the size of the DCI format 2_1, zeroes are added to the DCI format 2_0 until the size of the DCI format 2_0 is equal to the size of the DCI format 2_1; and for each DCI format 2_1, if a size budget limiting a number of DCI sizes the UE can be configured to monitor would otherwise be exceeded and if the size of the DCI format 2_1 is less than the size of the DCI format 2_0, zeroes are added to the DCI format 2_1 until the size of the DCI format 2_1 is equal to the size of the DCI format 2_0.

In some embodiments, the method shown in FIG. 3 may comprise, responsive to either DCI format 2_2 or DCI format 2_3 being configured for monitoring by the UE, applying a ninth rule specifying that: for each DCI format 2_2, if a size budget limiting a number of DCI sizes the UE can be configured to monitor would otherwise be exceeded and if the size of the DCI format 2_2 is less than the size of the DCI format 1_0 monitored in the CSS, zeroes are added to the DCI format 2_2 until the size of the DCI format 2_2 is equal to the size of the DCI format 1_0 monitored in the CSS; for each DCI format 2_3, if a size budget limiting a number of DCI sizes the UE can be configured to monitor would otherwise be exceeded and if the size of the DCI format 2_3 is less than the size of the DCI format 1_0 monitored in the CSS, zeroes are added to the DCI format 2_3 until the size of the DCI format 2_3 is equal to the size of the DCI format 1_0 monitored in the CSS.

In some embodiments, the method carried out by the UE may further comprise monitoring one or more configured search spaces for a DCI message targeted to the user equipment, using the determined DCI sizes. This is shown at block 330 of FIG. 3.

Figure 4:
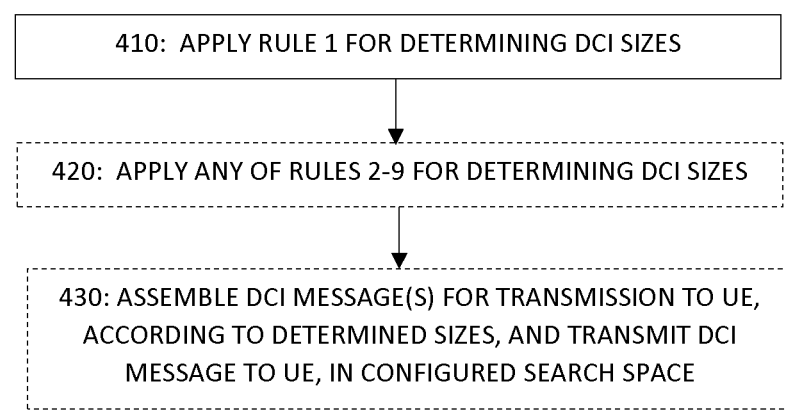
FIG. 4 is a process flow diagram illustrating an example method implemented by a base station, according to some embodiments.

FIG. 4 illustrates a process flow diagram for another example method according to some of the techniques described herein. The method illustrated in FIG. 4 includes the application by a base station, such as a gNB, of Rule 1 as described above, for determining DCI sizes to be monitored by a UE, and optionally includes the application of any one or more of Rules 2_9, as well.

As shown at block 410, the base station applies Rule 1. According to this rule, for a frequency domain resource allocation (FDRA) field in each DCI format, the base station uses a field size that is a function of the size of a bandwidth part (BWP), where the size of the bandwidth part in the function is determined according to a first rule specifying that (i) the size of the BWP is the size of an active uplink BWP or an initial uplink BWP for a DCI format 0_0 configured to be monitored by the UE in a UE-specific search space (USS), (ii) the size of the BWP is the size of an initial uplink BWP for a DCI format 0_0 not configured to be monitored by the UE in a USS, (iii) the size of the BWP is the size of an active downlink BWP or an initial downlink BWP or CORESET 0 for a DCI format 1_0 configured to be monitored by the UE in a USS, (iv) the size of the BWP is the size of an initial downlink BWP for DCI format 1_0 not configured to be monitored by the UE in a USS, if CORESET 0 is not configured in the cell, and (v) the size of the BWP is the size of CORESET 0 for DCI format 1_0 not configured to be monitored by the UE in a USS, if CORESET 0 is configured in the cell.

As shown at block 420, the base station also applies any one or more of Rules 2_9, as described above.

This may comprise, for example, for each DCI format 0_1 and 1_1 configured to be monitored by the UE in a USS, applying a second rule specifying that (i) zero padding is added to a DCI format 0_1 smaller than a maximum size of DCI format 0_1, until the size of the DCI format 0_1 is equal to the maximum size of DCI format 0_1, and (ii) zero padding is added to a DCI format 1_1 smaller than a maximum size of DCI format 1_1, until the size of the DCI format 1_1 is equal to the maximum size of DCI format 1_1.

In some embodiments, this may comprise, for each DCI format 0_0 and DCI format 1_0 configured to be monitored by the UE in a first USS, applying a third rule specifying that (i) if the size of the DCI format 0_0 is smaller than the size of a DCI format 1_0 configured to be monitored by the UE by the UE in the first USS, zeroes are added to the DCI format 0_0 until the size of the DCI format 0_0 equals the size of the DCI format 1_0 configured to be monitored by the UE in the first USS, (ii) if the size of the DCI format 1_0 is smaller than the size of a DCI format 0_0 configured to be monitored by the UE in the first USS, zeroes are added to the DCI format 1_0 until the size of the DCI format 1_0 equals the size of the DCI format 0_0 configured to be monitored by the UE in the first USS, (iii) if the size of any DCI format 0_1 configured to be monitored by the UE in a USS other than the first USS is the same as the size of the DCI format 0_0 configured to be monitored by the UE in the first USS or the size of the DCI format 1_0 configured to be monitored by the UE in the first USS, a zero is appended to the end of the DCI format 0_1, and (iv) if the size of any DCI format 1_1 configured to be monitored by the UE in a USS other than the first USS is the same as the size of the DCI format 0_0 configured to be monitored by the UE in the first USS or the size of the DCI format 1_0 configured to be monitored by the UE in the first USS, a zero is appended to the end of the DCI format 1_1.

In some embodiments, this may comprise, for each DCI format 0_0 and DCI format DCI 1_0 configured to be monitored by the UE in a common search space (CSS), applying a fourth rule specifying that (i) if the size of the DCI format 0_0 configured to be monitored by the UE in the CSS is less than the size of a DCI format 1_0 configured to be monitored by the UE in the CSS, zeroes are added to the DCI format 0_0 configured to be monitored by the UE in the CSS until the size of the DCI format 0_0 configured to be monitored by the UE in the CSS is equal to the size of the DCI format 1_0 configured to be monitored by the UE in the CSS, and (ii) if the size of the DCI format 1_0 configured to be monitored by the UE in the CSS is less than the size of a DCI format 0_0 configured to be monitored by the UE in the CSS, most significant bits of the FDRA field in the DCI format 0_0 configured to be monitored by the UE in the CSS are truncated until the size of the DCI format 0_0 configured to be monitored by the UE in the CSS is equal to the size of the DCI format 1_0 configured to be monitored by the UE in the CSS. In some of these embodiments, this may further comprise, after applying the fourth rule, applying a fifth rule specifying that, for each DCI format 0_0 configured to be monitored by the UE in a USS, if the size of the DCI format 0_0 configured to be monitored by the UE in the USS is less than the size of a DCI format 1_0 configured to be monitored by the UE in the USS, zeroes are added to the DCI format 0_0 configured to be monitored by the UE in the USS until the size of the DCI format 0_0 configured to be monitored by the UE in the USS is equal to the size of the DCI format 1_0 configured to be monitored by the UE in the USS; and for each DCI format 1_0 configured to be monitored by the UE in a USS, if the size of the DCI format 1_0 configured to be monitored by the UE in the USS is less than the size of a DCI format 0_0 configured to be monitored by the UE in the USS, zeroes are added to the DCI format 1_0 configured to be monitored by the UE in the USS until the size of the DCI format 1_0 configured to be monitored by the UE in the USS is equal to the size of the DCI format 0_0 configured to be monitored by the UE in the USS.

In some embodiments, the method may comprise, responsive to (i) DCI format 0_0 or DCI format 1_0 being configured for monitoring by the UE in a common search space (CSS), and (ii) DCI format 0_0 or DCI format 1_0 being configured for monitoring by the UE in a first USS, and (iii) DCI format 0_1 or DCI format 1_1 being configured for monitoring by the UE in a second USS, applying a sixth rule specifying that: for each DCI format 0_0 configured to be monitored by the UE in the CSS, the field size for the FDRA field is determined a function of the initial uplink BWP; for each DCI format 1_0 configured to be monitored by the UE in the CSS, the field size for the FDRA field is determined as a function of the size of CORESET 0, if CORESET 0 is present, or as a function of the size of the initial downlink BWP, if CORESET 0 is not present; for each DCI format 0_0 configured to be monitored by the UE in the first USS, if the size of the DCI format 0_0 is smaller than the size of the DCI format 1_0 configured to be monitored by the UE in the first USS, zeroes are added to the DCI format 0_0 configured to be monitored by the UE in the first USS until the size of the DCI format 0_0 configured to be monitored by the UE in the first USS is equal to the size of the DCI format 1_0 configured to be monitored by the UE in the first USS; and for each DCI format 0_0 configured to be monitored by the UE in the first USS, if the size of the DCI format 0_0 is greater than the size of the DCI format 1_0 configured to be monitored by the UE in the first USS, most significant bits of the FDRA field of the DCI format 0_0 configured to be monitored by the UE in the first USS are truncated until the size of the DCI format 0_0 configured to be monitored by the UE in the first USS is equal to the size of the DCI format 1_0 configured to be monitored by the UE in the first USS.

In some embodiments, responsive to (i) DCI format 0_0 or DCI format 1_0 being configured for monitoring by the UE in a common search space, CSS, and (ii) DCI format 0_0 or DCI format 1_0 being configured for monitoring by the UE in a first USS, and (iii) DCI format 0_1 or DCI format 1_1 being configured for monitoring by the UE in a second USS, the method may comprise, after applying the fourth rule, applying a seventh rule according to Rule 7cc described above.

In some embodiments, the method may comprise, responsive to both DCI format 2_0 and DCI format 2_1 being configured for monitoring by the UE, applying an eighth rule specifying that: for each DCI format 2_0 configured to be monitored by the UE, if a size budget limiting a number of DCI sizes the UE can be configured to monitor would otherwise be exceeded and if the size of the DCI format 2_0 is less than the size of the DCI format 2_1 configured to be monitored by the UE, zeroes are added to the DCI format 2_0 until the size of the DCI format 2_0 is equal to the size of the DCI format 2_1 configured to be monitored by the UE; and for each DCI format 2_1, if a size budget limiting a number of DCI sizes the UE can be configured to monitor would otherwise be exceeded and if the size of the DCI format 2_1 is less than the size of the DCI format 2_0 configured to be monitored by the UE, zeroes are added to the DCI format 2_1 until the size of the DCI format 2_1 is equal to the size of the DCI format 2_0 configured to be monitored by the UE.

In some embodiments, the method shown in FIG. 4 may comprise, responsive to either DCI format 2_2 or DCI format 2_3 being configured for monitoring by the UE, applying a ninth rule specifying that: for each DCI format 2_2, if a size budget limiting a number of DCI sizes the UE can be configured to monitor would otherwise be exceeded and if the size of the DCI format 2_2 is less than the size of the DCI format 1_0 configured to be monitored by the UE in the CSS, zeroes are added to the DCI format 2_2 until the size of the DCI format 2_2 is equal to the size of the DCI format 1_0 configured to be monitored by the UE in the CSS; for each DCI format 2_3, if a size budget limiting a number of DCI sizes the UE can be configured to monitor would otherwise be exceeded and if the size of the DCI format 2_3 is less than the size of the DCI format 1_0 configured to be monitored by the UE in the CSS, zeroes are added to the DCI format 2_3 until the size of the DCI format 2_3 is equal to the size of the DCI format 1_0 configured to be monitored by the UE in the CSS.

In some embodiments, the method carried out by the base station may further comprise assembling a DCI message for transmission to the UE, according to one of the determined DCI sizes, and transmitting the DCI message to the UE in a search space configured for the UE. This is shown at block 430 of FIG. 4.

Abbreviations

3GPP 3rd Generation Partnership Project
BWP Bandwidth part
CORESET Control resource set
CRC Cyclic redundancy check
CSI Channel state information
CSS Common search space
DCI Downlink control information
DL Downlink
eMBB Enhanced mobile broadband
FDRA Frequency domain resource assignment
gNB 5G Node B
mMTC Massive machine type communications
MSB Most significant bit
NR New Radio
PCell Primary cell
PSCell Primary SCG cell
RB Resource Block
RNTI Radio Network Temporary Identifier
C-RNTI Cell RNTI
TC-RNTI Temporary Cell RNTI
CS-RNTI Configured Scheduling RNTI
MCS-C-RNTI Modulation Coding Scheme Cell RNTI
SP-CSI-RNTI Semi-Persistent CSI RNTI
SCell Secondary cell
SCG Secondary cell group
SUL Supplementary uplink
TDD Time division multiplexing
UE User equipment
UL Uplink
URLLC Ultra-reliable low latency communications
USS UE specific search space

EXAMPLE EMBODIMENTS

Examples of methods and apparatuses according to the present disclosure include, but are not limited to, the following:

Example embodiment 1. A method, in a user equipment, for determining downlink control information, DCI, sizes for monitoring by the user equipment, UE, the method comprising:
  determining DCI sizes for monitoring by performing size matching between different DCI formats according to rule 1 as described herein and according to any one or more of rules 2_9 as described herein.

Example embodiment 2. The method of example embodiment 1, further comprising monitoring one or more configured search spaces for a DCI message targeted to the user equipment, using the determined DCI sizes.

Example embodiment 3. A method, in a base station, for determining downlink control information, DCI, sizes to be monitored by a user equipment, UE, served by the base station, the method comprising:
  determining DCI sizes to be monitored by the UE by performing size matching between different DCI formats according to rule 1 as described herein and according to any one or more of rules 2_9 as described herein.

Example embodiment 4. The method of example embodiment 3, further comprising:
  assembling a DCI message for transmission to the UE, according to one of the determined DCI sizes; and
  transmitting the DCI message to the UE in a search space configured for the UE.

Example embodiment 5. A user equipment, UE, for use in a wireless communications system, the UE being adapted to:
  determine DCI sizes for monitoring by performing size matching between different DCI formats according to rule 1 as described herein and according to any one or more of rules 2_9 as described herein.

Example embodiment 6. The UE of example embodiment 5, the UE being further adapted to monitor one or more configured search spaces for a DCI message targeted to the user equipment, using the determined DCI sizes.

Example embodiment 7. A base station, for use in a wireless communications system, the base station being adapted to:
  determine DCI sizes to be monitored by the UE by performing size matching between different DCI formats according to rule 1 as described herein and according to any one or more of rules 2_9 as described herein.

Example embodiment 8. The base station of example embodiment 7, the base station being further adapted to:
  assemble a DCI message for transmission to the UE, according to one of the determined DCI sizes; and
  transmit the DCI message to the UE in a search space configured for the UE.

What is claimed is:

1. A method, in a user equipment, for determining downlink control information (DCI) sizes for monitoring by the user equipment (UE) in a cell, the method comprising:
  for a frequency domain resource allocation (FDRA) field in each DCI format 0_0 and DCI format 1_0, using a field size that is a function of the size of a bandwidth part (BWP), wherein the size of the bandwidth part in the function is determined according to a first rule specifying that (i) the size of the BWP is the size of an active uplink BWP or an initial uplink BWP for a DCI format 0_0 monitored in a UE-specific search space, USS, (ii) the size of the BWP is the size of an initial uplink BWP for a DCI format 0_0 not monitored in a USS, (iii) the size of the BWP is the size of an active downlink BWP or an initial downlink BWP or CORESET 0 for a DCI format 1_0 monitored in a USS, (iv) the size of the BWP is the size of an initial downlink BWP for DCI format 1_0 not monitored in a USS, if CORESET 0 is not configured in the cell, and (v) the size of the BWP is the size of CORESET 0 for DCI format 1_0 not monitored in a USS, if CORESET 0 is configured in the cell;
  for each DCI format 0_0 and DCI format DCI 1_0 monitored in a common search space, CSS, applying a second rule specifying that (i) if the size of the DCI format 0_0 monitored in the CSS is less than the size of a DCI format 1_0 monitored in the CSS, zeroes are added to the DCI format 0_0 monitored in the CSS until the size of the DCI format 0_0 monitored in the CSS is equal to the size of the DCI format 1_0 monitored in the CSS, and (ii) if the size of the DCI format 1_0 monitored in the CSS is less than the size of a DCI format 0_0 monitored in the CSS, most significant bits of the FDRA field in the DCI format 0_0 are truncated until the size of the DCI format 0_0 monitored in the CSS is equal to the size of the DCI format 1_0 monitored in the CSS; and, after applying the second rule, applying a third rule specifying that
  for each DCI format 0_0 monitored in a USS, if the size of the DCI format 0_0 monitored in the USS is less than the size of a DCI format 1_0 monitored in the USS, zeroes are added to the DCI format 0_0 monitored in the USS until the size of the DCI format 0_0 monitored in the USS is equal to the size of the DCI format 1_0 monitored in the USS; and
  for each DCI format 1_0 monitored in a USS, if the size of the DCI format 1_0 monitored in the USS is less than the size of a DCI format 0_0 monitored in the USS, zeroes are added to the DCI format 1_0 monitored in the USS until the size of the DCI format 1_0 monitored in the USS is equal to the size of the DCI format 0_0 monitored in the USS.

2. The method of claim 1, further comprising:
for each DCI format 0_1 and 1_1 monitored in a USS, applying a second-fourth rule specifying that (i) zero padding is added to a DCI format 0_1 smaller than a maximum size of DCI format 0_1, until the size of the DCI format 0_1 is equal to the maximum size of DCI format 0_1, and (ii) zero padding is added to a DCI format 1_1 smaller than a maximum size of DCI format 1_1, until the size of the DCI format 1_1 is equal to the maximum size of DCI format 1_1.

3. The method of claim 2, further comprising:
monitoring one or more configured search spaces for a DCI message targeted to the user equipment, using the determined DCI sizes.

4. The method of claim 1, further comprising:
for each DCI format 0_0 and DCI format 1_0 monitored in a first USS, applying a-third fifth rule specifying that (i) if the size of the DCI format 0_0 is smaller than the size of a DCI format 1_0 configured to be monitored by the UE in the first USS, zeroes are added to the DCI format 0_0 until the size of the DCI format 0_0 equals the size of DCI format 1_0 configured to be monitored by the UE in the first USS, (ii) if the size of the DCI format 1_0 is smaller than the size of a DCI format 0_0 configured to be monitored by the UE in the first USS, zeroes are added to the DCI format 1_0 until the size of the DCI format 1_0 equals the size of the DCI format 0_0 configured to be monitored by the UE in the first USS, (iii) if the size of any DCI format 0_1 monitored in a USS other than the first USS is the same as the size of the DCI format 0_0 configured to be monitored by the UE in the first USS or the size of the DCI format 1_0 configured to be monitored by the UE in the first USS, a zero is appended to the end of the DCI format 0_1, and (iv) if the size of any DCI format 1_1 monitored in a USS other than the first USS is the same as the size of the DCI format 0_0 configured to be monitored by the UE in the first USS or the size of the DCI format 1_0 configured to be monitored by the UE in the first USS, a zero is appended to the end of the DCI format 1_1.

5. The method of claim 1, further comprising, responsive to (i) DCI format 0_0 or DCI format 1_0 being configured for monitoring by the UE in a common search space, CSS, and (ii) DCI format 0_0 or DCI format 1_0 being configured for monitoring by the UE in a first USS, and (iii) DCI format 0_1 or DCI format 1_1 being configured for monitoring by the UE in a second USS, applying a sixth rule specifying that:
  for each DCI format 0_0 monitored in the CSS, the field size for the FDRA field is determined as a function of the initial uplink BWP;
  for each DCI format 1_0 monitored in the CSS, the field size for the FDRA field is determined as a function of the size of CORESET 0, if CORESET 0 is present, or as a function of the size of the initial downlink BWP, if CORESET 0 is not present;
  for each DCI format 0_0 monitored in the first USS, if the size of the DCI format 0_0 is smaller than the size of the DCI format 1_0 monitored in the first USS, zeroes are added to the DCI format 0_0 monitored in the first USS until the size of the DCI format 0_0 monitored in the first USS is equal to the size of the DCI format 1_0 monitored in the first USS; and
  for each DCI format 0_0 monitored in the first USS, if the size of the DCI format 0_0 is greater than the size of the DCI format 1_0 monitored in the first USS, most significant bits of the FDRA field of the DCI format 0_0 monitored in the first USS are truncated until the size of the DCI format 0_0 monitored in the first USS is equal to the size of the DCI format 1_0 monitored in the first USS.

6. The method of claim 1, further comprising, responsive to (i) DCI format 0_0 or DCI format 1_0 being configured for monitoring by the UE in a common search space, CSS, and (ii) DCI format 0_0 or DCI format 1_0 being configured for monitoring by the UE in a first USS, and (iii) DCI format 0_1 or DCI format 1_1 being configured for monitoring by the UE in a second USS, and after applying the fourth second rule, applying a seventh rule specifying that:
  if a size budget limiting a number of DCI sizes the UE can be configured to monitor for DCI with C-RNTI or CS-RNTI or SP-CSI-RNTI is exceeded:
    applying a sub-rule specifying that: for each DCI format 0_0 monitored in the CSS, the field size for the FDRA field is determined as a function of the initial uplink BWP; for each DCI format 1_0 monitored in the CSS, the field size for the FDRA field is determined as a function of the size of CORESET 0, if CORESET 0 is present, or as a function of the size of the initial downlink BWP, if CORESET 0 is not present; for each DCI format 0_0 monitored in the first USS, if the size of the DCI format 0_0 is smaller than the size of the DCI format 1_0 monitored in the first USS, zeroes are added to the DCI format 0_0 monitored in the first USS until the size of the DCI format 0_0 monitored in the first USS is equal to the size of the DCI format 1_0 monitored in the first USS; and for each DCI format 0_0 monitored in the first USS, if the size of the DCI format 0_0 is greater than the size of the DCI format 1_0 monitored in the first USS, most significant bits of the FDRA field of the DCI format 0_0 monitored in the first USS are truncated until the size of the DCI format 0_0 monitored in the first USS is equal to the size of the DCI format 1_0 monitored in the first USS;
  for each DCI format 0_1 monitored in the second USS, if the size of the DCI format 0_1 is equal to the size of the DCI format 0_0 or DCI format 1_0 monitored in the first USS, a zero is appended to the end of the DCI format 0_1; and
  for each DCI format 1_1 monitored in the second USS, if the size of the DCI format 1_1 is equal to the size of the DCI format 0_0 or DCI format 1_0 monitored in the first USS, a zero is appended to the end of the DCI format 1_1;

otherwise:
for each DCI format 0_0 monitored in the first USS and DCI format 1_0 monitored in the first USS, zeroes are added to the smaller of the DCI format 0_0 monitored in the first USS and the DCI format 1_0 monitored in the first USS, until the sizes of the DCI format 0_0 monitored in the first USS and the DCI format 1_0 monitored in the first USS are the same;

for each DCI format 0_1 monitored in the second USS, if the size of the DCI format 0_1 is equal to the size of the DCI format 0_0 or DCI format 1_0 monitored in the first USS, a zero is appended to the end of the DCI format 0_1; and for each DCI format 1_1 monitored in the second USS, if the size of the DCI format 1_1 is equal to the size of the DCI format 0_0 or DCI format 1_0 monitored in the first USS, a zero is appended to the end of the DCI format 1_1;

if the size budget limiting a number of DCI sizes the UE can be configured to monitor for DCI with C-RNTI or CS-RNTI or SP-CSI-RNTI is exceeded after the preceding steps are performed:

removing any bit added to the DCI format 0_1 and removing any bit added to the DCI format 1_1;

applying the sub-rule specifying that: for each DCI format 0_0 monitored in the CSS, the field size for the FDRA field is determined as a function of the initial uplink BWP; for each DCI format 1_0 monitored in the CSS, the field size for the FDRA field is determined as a function of the size of CORESET 0, if CORESET 0 is present, or as a function of the size of the initial downlink BWP, if CORESET 0 is not present; for each DCI format 0_0 monitored in the first USS, if the size of the DCI format 0_0 is smaller than the size of the DCI format 1_0 monitored in the first USS, zeroes are added to the DCI format 0_0 monitored in the first USS until the size of the DCI format 0_0 monitored in the first USS is equal to the size of the DCI format 1_0 monitored in the first USS; and for each DCI format 0_0 monitored in the first USS, if the size of the DCI format 0_0 is greater than the size of the DCI format 1_0 monitored in the first USS, most significant bits of the FDRA field of the DCI format 0_0 monitored in the first USS are truncated until the size of the DCI format 0_0 monitored in the first USS is equal to the size of the DCI format 1_0 monitored in the first USS;

for each DCI format 0_1 monitored in the second USS, if the size of the DCI format 0_1 is equal to the size of the DCI format 0_0 or DCI format 1_0 monitored in the first USS, a zero is appended to the end of the DCI format 0_1; and for each DCI format 1_1 monitored in the second USS, if the size of the DCI format 1_1 is equal to the size of the DCI format 0_0 or DCI format 1_0 monitored in the first USS, a zero is appended to the end of the DCI format 1_1.

7. The method of claim 1, further comprising, responsive to both DCI format 2_0 and DCI format 2_1 being configured for monitoring, applying an eighth rule specifying that:
for each DCI format 2_0, if a size budget limiting a number of DCI sizes the UE can be configured to monitor would otherwise be exceeded and if the size of the DCI format 2_0 is less than the size of the DCI format 2_1, zeroes are added to the DCI format 2_0 until the size of the DCI format 2_0 is equal to the size of the DCI format 2_1; and for each DCI format 2_1, if a size budget limiting a number of DCI sizes the UE can be configured to monitor would otherwise be exceeded and if the size of the DCI format 2_1 is less than the size of the DCI format 2_0, zeroes are added to the DCI format 2_1 until the size of the DCI format 2_1 is equal to the size of the DCI format 2_0.

8. The method of claim 1, further comprising, responsive to either DCI format 2_2 or DCI format 2_3 being configured for monitoring by the UE, applying a ninth rule specifying that:
for each DCI format 2_2, if a size budget limiting a number of DCI sizes the UE can be configured to monitor would otherwise be exceeded and if the size of the DCI format 2_2 is less than the size of the DCI format 1_0 monitored in the CSS, zeroes are added to the DCI format 2_2 until the size of the DCI format 2_2 is equal to the size of the DCI format 1_0 monitored in the CSS;

for each DCI format 2_3, if a size budget limiting a number of DCI sizes the UE can be configured to monitor would otherwise be exceeded and if the size of the DCI format 2_3 is less than the size of the DCI format 1_0 monitored in the CSS, zeroes are added to the DCI format 2_3 until the size of the DCI format 2_3 is equal to the size of the DCI format 1_0 monitored in the CSS.

9. A method, in a base station, for determining downlink control information (DCI) sizes to be monitored by a user equipment (UE) served by the base station, the method comprising:
for a frequency domain resource allocation (FDRA) field in each DCI format 0_0 and DCI format 1_0, using a field size that is a function of the size of a bandwidth part (BWP), wherein the size of the bandwidth part in the function is determined according to a first rule specifying that (i) the size of the BWP is the size of an active uplink BWP or an initial uplink BWP for a DCI format 0_0 configured to be monitored by the UE in a UE-specific search space, USS, (ii) the size of the BWP is the size of an initial uplink BWP for a DCI format 0_0 not configured to be monitored by the UE in a USS, (iii) the size of the BWP is the size of an active downlink BWP or an initial downlink BWP or CORESET 0 for a DCI format 1_0 configured to be monitored by the UE in a USS, (iv) the size of the BWP is the size of an initial downlink BWP for DCI format 1_0 not configured to be monitored by the UE in a USS, if CORESET 0 is not configured in the cell, and (v) the size of the BWP is the size of CORESET 0 for DCI format 1_0 not configured to monitored by the UE in a USS, if CORESET 0 is configured in the cell;

for each DCI format 0_0 and DCI format DCI 1_0 configured to be monitored by the UE in a common search space, CSS, applying a second rule specifying that (i) if the size of the DCI format 0_0 configured to be monitored by the UE in the CSS is less than the size of a DCI format 1_0 configured to be monitored by the UE in the CSS, zeroes are added to the DCI format 0_0 configured to be monitored by the UE in the CSS until the size of the DCI format 0_0 configured to be monitored by the UE in the CSS is equal to the size of the DCI format 1_0 configured to be monitored by the UE in the CSS, and (ii) if the size of the DCI format 1_0 configured to be monitored by the UE in the CSS is less than the size of a DCI format 0_0 configured to be monitored by the UE in the CSS, most significant bits of the FDRA field in the DCI format 0_0 configured to be monitored by the UE in the CSS are truncated until the size of the DCI format 0_0 configured to be monitored by the UE in the CSS is equal to the size of the DCI format 1_0 configured to be monitored by the UE in the CSS; and, after applying the second rule, applying a third rule specifying that
- for each DCI format 0_0 configured to be monitored by the UE in a USS, if the size of the DCI format 0_0 configured to be monitored by the UE in the USS is less than the size of a DCI format 1_0 configured to be monitored by the UE in the USS, zeroes are added to the DCI format 0_0 configured to be monitored by the UE in the USS until the size of the DCI format 0_0 configured to be monitored by the UE in the USS is equal to the size of the DCI format 1_0 configured to be monitored by the UE in the USS; and
- for each DCI format 1_0 configured to be monitored by the UE in a USS, if the size of the DCI format 1_0 configured to be monitored by the UE in the USS is less than the size of a DCI format 0_0 configured to be monitored by the UE in the USS, zeroes are added to the DCI format 1_0 configured to be monitored by the UE in the USS until the size of the DCI format 1_0 configured to be monitored by the UE in the USS is equal to the size of the DCI format 0_0 configured to be monitored by the UE in the USS.

10. The method of claim 9, further comprising:
for each DCI format 0_1 and 1_1 configured to be monitored by the UE in a USS, applying a fourth rule specifying that (i) zero padding is added to a DCI format 0_1 smaller than a maximum size of DCI format 0_1, until the size of the DCI format 0_1 is equal to the maximum size of DCI format 0_1, and (ii) zero padding is added to a DCI format 1_1 smaller than a maximum size of DCI format 1_1, until the size of the DCI format 1_1 is equal to the maximum size of DCI format 1_1.

11. The method of claim 10, further comprising:
assembling a DCI message for transmission to the UE, according to one of the determined DCI sizes; and
transmitting the DCI message to the UE in a search space configured for the UE.

12. The method of claim 9, further comprising:
for each DCI format 0_0 and DCI format 1_0 configured to be monitored by the UE in a first USS, applying a fifth rule specifying that (i) if the size of the DCI format 0_0 is smaller than the size of a DCI format 1_0 configured to be monitored by the UE in the first USS, zeroes are added to the DCI format 0_0 until the size of the DCI format 0_0 equals the size of the DCI format 1_0 configured to be monitored by the UE in the first USS, (ii) if the size of the DCI format 1_0 is smaller than the size of a DCI format 0_0 configured to be monitored by the UE in the first USS, zeroes are added to the DCI format 1_0 until the size of the DCI format 1_0 equals the size of the DCI format 0_0 configured to be monitored by the UE in the first USS, (iii) if the size of any DCI format 0_1 configured to be monitored by the UE in a USS other than the first USS is the same as the size of the DCI format 0_0 configured to be monitored by the UE in the first USS or the size of the DCI format 1_0 configured to be monitored by the UE in the first USS, a zero is appended to the end of the DCI format 0_1, and (iv) if the size of any DCI format 1_1 configured to be monitored by the UE in a USS other than the first USS is the same as the size of the DCI format 0_0 configured to be monitored by the UE in the first USS or the size of the DCI format 1_0 configured to be monitored by the UE in the first USS, a zero is appended to the end of the DCI format 1_1.

13. The method of claim 9, further comprising, responsive to (i) DCI format 0_0 or DCI format 1_0 being configured for monitoring by the UE in a common search space, CSS, and (ii) DCI format 0_0 or DCI format 1_0 being configured for monitoring by the UE in a first USS, and (iii) DCI format 0_1 or DCI format 1_1 being configured for monitoring by the UE in a second USS, applying a sixth rule specifying that:
- for each DCI format 0_0 configured to be monitored by the UE in the CSS, the field size for the FDRA field is determined a function of the initial uplink BWP;
- for each DCI format 1_0 configured to be monitored by the UE in the CSS, the field size for the FDRA field is determined as a function of the size of CORESET 0, if CORESET 0 is present, or as a function of the size of the initial downlink BWP, if CORESET 0 is not present;
- for each DCI format 0_0 configured to be monitored by the UE in the first USS, if the size of the DCI format 0_0 is smaller than the size of the DCI format 1_0 configured to be monitored by the UE in the first USS, zeroes are added to the DCI format 0_0 configured to be monitored by the UE in the first USS until the size of the DCI format 0_0 configured to be monitored by the UE in the first USS is equal to the size of the DCI format 1_0 configured to be monitored by the UE in the first USS; and
- for each DCI format 0_0 configured to be monitored by the UE in the first USS, if the size of the DCI format 0_0 is greater than the size of the DCI format 1_0 configured to be monitored by the UE in the first USS, most significant bits of the FDRA field of the DCI format 0_0 configured to be monitored by the UE in the first USS are truncated until the size of the DCI format 0_0 configured to be monitored by the UE in the first USS is equal to the size of the DCI format 1_0 configured to be monitored by the UE in the first USS.

14. The method of claim 9, further comprising, responsive to (i) DCI format 0_0 or DCI format 1_0 being configured for monitoring by the UE in a common search space, CSS, and (ii) DCI format 0_0 or DCI format 1_0 being configured for monitoring by the UE in a first USS, and (iii) DCI format 0_1 or DCI format 1_1 being configured for monitoring by the UE in a second USS, and after applying the fourth second rule, applying a seventh rule specifying that:
- if a size budget limiting a number of DCI sizes the UE can be configured to monitor for DCI with C-RNTI or CS-RNTI or SP-CSI-RNTI is exceeded:
  - applying a sub-rule specifying that: for each DCI format 0_0 configured to be monitored by the UE in the CSS, the field size for the FDRA field is determined as a function of the initial uplink BWP; for each DCI format 1_0 configured to be monitored by the UE in the CSS, the field size for the FDRA field is determined as a function of the size of CORESET 0, if CORESET 0 is present, or as a function of the size of the initial downlink BWP, if CORESET 0 is not present; for each DCI format 0_0 configured to be monitored by the UE in the first USS, if the size of the DCI format 0_0 is smaller than the size of the DCI format 1_0 configured to be monitored by the UE in the first USS, zeroes are added to the DCI format 0_0 configured to be monitored by the UE in the first USS until the size of the DCI format 0_0 configured to be monitored by the UE in the first USS is equal to the size of the DCI format 1_0 configured to be monitored by the UE in the first USS; and for each DCI format 0_0 configured to be monitored by the UE in the first USS, if the size of the DCI format 0_0 is greater than the size of the DCI format 1_0 configured to be monitored by the UE in the first USS, most significant bits of the FDRA field of the DCI format 0_0 configured to be monitored by the UE in the first USS are truncated until the size of the DCI format 0_0 configured to be monitored by the UE in the first USS is equal to the size of the DCI format 1_0 configured to be monitored by the UE in the first USS;

for each DCI format 0_1 configured to be monitored by the UE in the second USS, if the size of the DCI format 0_1 is equal to the size of the DCI format 0_0 or DCI format 1_0 configured to be monitored by the UE in the first USS, a zero is appended to the end of the DCI format 0_1; and for each DCI format 1_1 configured to be monitored by the UE in the second USS, if the size of the DCI format 1_1 is equal to the size of the DCI format 0_0 or DCI format 1_0 configured to be monitored by the UE in the first USS, a zero is appended to the end of the DCI format 1_1;

otherwise:

for each DCI format 0_0 configured to be monitored by the UE in the first USS and DCI format 1_0 configured to be monitored by the UE in the first USS, zeroes are added to the smaller of the DCI format 0_0 configured to be monitored by the UE in the first USS and DCI format 1_0 configured to be monitored by the UE in the first USS, until the sizes of the DCI format 0_0 configured to be monitored by the UE in the first USS and the DCI format 1_0 configured to be monitored by the UE in the first USS are the same;

for each DCI format 0_1 configured to be monitored by the UE in the second USS, if the size of the DCI format 0_1 is equal to the size of the DCI format 0_0 or DCI format 1_0 configured to be monitored by the UE in the first USS, a zero is appended to the end of the DCI format 0_1; and for each DCI format 1_1 configured to be monitored by the UE in the second USS, if the size of the DCI format 1_1 is equal to the size of the DCI format 0_0 or DCI format 1_0 configured to be monitored by the UE in the first USS, a zero is appended to the end of the DCI format 1_1;

if the size budget limiting a number of DCI sizes the UE can be configured to monitor for DCI with C-RNTI or CS-RNTI or SP-CSI-RNTI is exceeded after the preceding steps are performed:

removing any bit added to the DCI format 0_1 and removing any bit added to the DCI format 1_1;

applying the sub-rule specifying that: for each DCI format 0_0 configured to be monitored by the UE in the CSS, the field size for the FDRA field is determined as a function of the initial uplink BWP; for each DCI format 1_0 configured to be monitored by the UE in the CSS, the field size for the FDRA field is determined as a function of the size of CORESET 0, if CORESET 0 is present, or as a function of the size of the initial downlink BWP, if CORESET 0 is not present; for each DCI format 0_0 configured to be monitored by the UE in the first USS, if the size of the DCI format 0_0 is smaller than the size of the DCI format 1_0 configured to be monitored by the UE in the first USS, zeroes are added to the DCI format 0_0 configured to be monitored by the UE in the first USS until the size of the DCI format 0_0 configured to be monitored by the UE in the first USS is equal to the size of the DCI format 1_0 configured to be monitored by the UE in the first USS; and for each DCI format 0_0 configured to be monitored by the UE in the first USS, if the size of the DCI format 0_0 is greater than the size of the DCI format 1_0 configured to be monitored by the UE in the first USS, most significant bits of the FDRA field of the DCI format 0_0 configured to be monitored by the UE in the first USS are truncated until the size of the DCI format 0_0 configured to be monitored by the UE in the first USS is equal to the size of the DCI format 1_0 configured to be monitored by the UE in the first USS;

for each DCI format 0_1 configured to be monitored by the UE in the second USS, if the size of the DCI format 0_1 is equal to the size of the DCI format 0_0 or DCI format 1_0 configured to be monitored by the UE in the first USS, a zero is appended to the end of the DCI format 0_1; and for each DCI format 1_1 configured to be monitored by the UE in the second USS, if the size of the DCI format 1_1 is equal to the size of the DCI format 0_0 or DCI format 1_0 configured to be monitored by the UE in the first USS, a zero is appended to the end of the DCI format 1_1.

15. The method of claim 9, further comprising, responsive to both DCI format 2_0 and DCI format 2_1 being configured for monitoring by the UE, applying an eighth rule specifying that:

for each DCI format 2_0 configured to be monitored by the UE, if a size budget limiting a number of DCI sizes the UE can be configured to monitor would otherwise be exceeded and if the size of the DCI format 2_0 is less than the size of the DCI format 2_1 configured to be monitored by the UE, zeroes are added to the DCI format 2_0 until the size of the DCI format 2_0 is equal to the size of the DCI format 2_1 configured to be monitored by the UE; and for each DCI format 2_1, if a size budget limiting a number of DCI sizes the UE can be configured to monitor would otherwise be exceeded and if the size of the DCI format 2_1 is less than the size of the DCI format 2_0 configured to be monitored by the UE, zeroes are added to the DCI format 2_1 until the size of the DCI format 2_1 is equal to the size of the DCI format 2_0 configured to be monitored by the UE.

16. The method of claim 9, further comprising, responsive to either DCI format 2_2 or DCI format 2_3 being configured for monitoring by the UE, applying a ninth rule specifying that:

for each DCI format 2_2, if a size budget limiting a number of DCI sizes the UE can be configured to monitor would otherwise be exceeded and if the size of the DCI format 2_2 is less than the size of the DCI format 1_0 monitored in the CSS, zeroes are added to the DCI format 2_2 until the size of the DCI format 2_2 is equal to the size of the DCI format 1_0 configured to be monitored by the UE in the CSS;

for each DCI format 2_3, if a size budget limiting a number of DCI sizes the UE can be configured to monitor would otherwise be exceeded and if the size of the DCI format 2_3 is less than the size of the DCI format 1_0 configured to be monitored by the UE in the CSS, zeroes are added to the DCI format 2_3 until the size of the DCI format 2_3 is equal to the size of the DCI format 1_0 configured to be monitored by the UE in the CSS.

17. A user equipment (UE) for determining downlink control information (DCI) sizes for monitoring by the UE in a cell, the UE comprising transceiver circuitry configured to communicate with a wireless communications system and processing circuitry operatively coupled to the transceiver circuitry, wherein the processing circuitry is configured to:

for a frequency domain resource allocation (FDRA) field in each DCI format 0_0 and DCI format 1_0, use a field size that is a function of the size of a bandwidth part (BWP), wherein the size of the bandwidth part in the function is determined according to a first rule specifying that (i) the size of the BWP is the size of an active uplink BWP or an initial uplink BWP for a DCI format 0_0 monitored in a UE-specific search space, USS, (ii) the size of the BWP is the size of an initial uplink BWP for a DCI format 0_0 not monitored in a USS, (iii) the size of the BWP is the size of an active downlink BWP or an initial downlink BWP or CORESET 0 for a DCI format 1_0 monitored in a USS, (iv) the size of the BWP is the size of an initial downlink BWP for DCI format 1_0 not monitored in a USS, if CORESET 0 is not configured in the cell, and (v) the size of the BWP is the size of CORESET 0 for DCI format 1_0 not monitored in a USS, if CORESET 0 is configured in the cell;

for each DCI format 0_0 and DCI format DCI 1_0 monitored in a common search space, CSS, apply a second rule specifying that (i) if the size of the DCI format 0_0 monitored in the CSS is less than the size of a DCI format 1_0 monitored in the CSS, zeroes are added to the DCI format 0_0 monitored in the CSS until the size of the DCI format 0_0 monitored in the CSS is equal to the size of the DCI format 1_0 monitored in the CSS, and (ii) if the size of the DCI format 1_0 monitored in the CSS is less than the size of a DCI format 0_0 monitored in the CSS, most significant bits of the FDRA field in the DCI format 0_0 are truncated until the size of the DCI format 0_0 monitored in the CSS is equal to the size of the DCI format 1_0 monitored in the CSS; and after applying the second rule, apply a third rule specifying that:

for each DCI format 0_0 monitored in a USS, if the size of the DCI format 0_0 monitored in the USS is less than the size of a DCI format 1_0 monitored in the USS, zeroes are added to the DCI format 0_0 monitored in the USS until the size of the DCI format 0_0 monitored in the USS is equal to the size of the DCI format 1_0 monitored in the USS; and for each DCI format 1_0 monitored in a USS, if the size of the DCI format 1_0 monitored in the USS is less than the size of a DCI format 0_0 monitored in the USS, zeroes are added to the DCI format 1_0 monitored in the USS until the size of the DCI format 1_0 monitored in the USS is equal to the size of the DCI format 0_0 monitored in the USS.

18. The UE of claim 17, the processing circuitry being further configured to monitor one or more configured search spaces for a DCI message targeted to the UE, using the determined DCI sizes.

19. A base station for determining downlink control information (DCI) sizes to be monitored by a user equipment (UE) served by the base station, the base station being for use in a wireless communications system, the base station comprising transceiver circuitry configured to communicate with one or more UEs and processing circuitry operatively coupled to the transceiver circuitry, wherein the processing circuitry is configured to:

for a frequency domain resource allocation (FDRA) field in each DCI format 0_0 and DCI format 1_0, use a field size that is a function of the size of a bandwidth part (BWP), wherein the size of the bandwidth part in the function is determined according to a first rule specifying that (i) the size of the BWP is the size of an active uplink BWP or an initial uplink BWP for a DCI format 0_0 configured to be monitored by the UE in a UE-specific search space, USS, (ii) the size of the BWP is the size of an initial uplink BWP for a DCI format 0_0 not configured to be monitored by the UE in a USS, (iii) the size of the BWP is the size of an active downlink BWP or an initial downlink BWP or CORESET 0 for a DCI format 1_0 configured to be monitored by the UE in a USS, (iv) the size of the BWP is the size of an initial downlink BWP for DCI format 1_0 not configured to be monitored by the UE in a USS, if CORESET 0 is not configured in the cell, and (v) the size of the BWP is the size of CORESET 0 for DCI format 1_0 not configured to monitored by the UE in a USS, if CORESET 0 is configured in the cell;

for each DCI format 0_0 and DCI format DCI 1_0 configured to be monitored by the UE in a common search space, CSS, apply a second rule specifying that (i) if the size of the DCI format 0_0 configured to be monitored by the UE in the CSS is less than the size of a DCI format 1_0 configured to be monitored by the UE in the CSS, zeroes are added to the DCI format 0_0 configured to be monitored by the UE in the CSS until the size of the DCI format 0_0 configured to be monitored by the UE in the CSS is equal to the size of the DCI format 1_0 configured to be monitored by the UE in the CSS, and (ii) if the size of the DCI format 1_0 configured to be monitored by the UE in the CSS is less than the size of a DCI format 0_0 configured to be monitored by the UE in the CSS, most significant bits of the FDRA field in the DCI format 0_0 configured to be monitored by the UE in the CSS are truncated until the size of the DCI format 0_0 configured to be monitored by the UE in the CSS is equal to the size of the DCI format 1_0 configured to be monitored by the UE in the CSS; and after applying the second rule, apply a third rule specifying that:

for each DCI format 0_0 configured to be monitored by the UE in a USS, if the size of the DCI format 0_0 configured to be monitored by the UE in the USS is less than the size of a DCI format 1_0 configured to be monitored by the UE in the USS, zeroes are added to the DCI format 0_0 configured to be monitored by the UE in the USS until the size of the DCI format 0_0 configured to be monitored by the UE in the USS is equal to the size of the DCI format 1_0 configured to be monitored by the UE in the USS; and for each DCI format 1_0 configured to be monitored by the UE in a USS, if the size of the DCI format 1_0 configured to be monitored by the UE in the USS is less than the size of a DCI format 0_0 configured to be monitored by the UE in the USS, zeroes are added to the DCI format 1_0 configured to be monitored by the UE in the USS until the size of the DCI format 1_0 configured to be monitored by the UE in the USS is equal to the size of the DCI format 0_0 configured to be monitored by the UE in the USS.

20. The base station of claim 19, the processing circuitry being further configured to:

assemble a DCI message for transmission to the UE, according to one of the determined DCI sizes; and transmit the DCI message to the UE in a search space configured for the UE.

* * * * *

UNITED STATES PATENT AND TRADEMARK OFFICE
CERTIFICATE OF CORRECTION

PATENT NO. : 12,063,671 B2
APPLICATION NO. : 17/287047
DATED : August 13, 2024
INVENTOR(S) : Lin et al.

It is certified that error appears in the above-identified patent and that said Letters Patent is hereby corrected as shown below:

In the Specification

In Column 4, Line 23, delete "2_9." and insert -- 2-9. --, therefor.

In Column 7, Line 1, delete "00 size<USS DCI 10" and insert -- 0_0 size<USS DCI 1_0 --, therefor.

In Column 7, Line 2, delete "00 until USS DCI 00" and insert -- 0_0 until USS DCI 0_0 --, therefor.

In Column 7, Line 3, delete "10" and insert -- 1_0 --, therefor.

In Column 7, Line 4, delete "00 size>USS DCI 10" and insert -- 0_0 size>USS DCI 1_0 --, therefor.

In Column 7, Line 5, delete "10 until USS DCI 00" and insert -- 1_0 until USS DCI 0_0 --, therefor.

In Column 7, Line 6, delete "10" and insert -- 1_0 --, therefor.

In Column 9, Line 53, delete "21" and insert -- 2_1 --, therefor.

In Column 12, Line 51, delete "2_9" and insert -- 2-9 --, therefor.

In Column 13, Line 55, delete "2_9" and insert -- 2-9 --, therefor.

In Column 13, Line 60, delete "2_9," and insert -- 2-9, --, therefor.

In Column 14, Line 14, delete "2_9," and insert -- 2-9, --, therefor.

In Column 16, Line 21, delete "2_9," and insert -- 2-9, --, therefor.

In Column 16, Line 44, delete "2_9," and insert -- 2-9, --, therefor.

Signed and Sealed this
Eleventh Day of February, 2025

Coke Morgan Stewart
*Acting Director of the United States Patent and Trademark Office*

CERTIFICATE OF CORRECTION (continued)
U.S. Pat. No. 12,063,671 B2

In Column 19, Line 52, delete "2_9" and insert -- 2-9 --, therefor.

In Column 19, Line 64, delete "2_9" and insert -- 2-9 --, therefor.

In Column 20, Line 10, delete "2_9" and insert -- 2-9 --, therefor.

In Column 20, Line 21, delete "2_9" and insert -- 2-9 --, therefor.

In the Claims

In Column 20, Line 53, in Claim 1, delete "DCI format DCI 1_0" and insert -- DCI format 1_0 --, therefor.

In Column 21, Line 20, in Claim 2, delete "second-fourth" and insert -- fourth --, therefor.

In Column 21, Line 35, in Claim 4, delete "a-third fifth" and insert -- a fifth --, therefor.

In Column 22, Line 30, in Claim 6, delete "the fourth" and insert -- the --, therefor.

In Column 24, Line 55, in Claim 9, delete "DCI format DCI 1_0" and insert -- DCI format 1_0 --, therefor.

In Column 26, Line 50, in Claim 14, delete "the fourth" and insert -- the --, therefor.

In Column 29, Line 36, in Claim 17, delete "DCI format DCI 1_0" and insert -- DCI format 1_0 --, therefor.

In Column 30, Line 35, in Claim 19, delete "DCI format DCI 1_0" and insert -- DCI format 1_0 --, therefor.